US007199872B2

United States Patent
Van Cranenbroeck

(10) Patent No.: US 7,199,872 B2
(45) Date of Patent: Apr. 3, 2007

(54) METHOD AND APPARATUS FOR GROUND-BASED SURVEYING IN SITES HAVING ONE OR MORE UNSTABLE ZONE(S)

(75) Inventor: Joël Van Cranenbroeck, Mont/Yvoir (BE)

(73) Assignee: Leica Geosystems AG, Heerbrugg (CH)

( * ) Notice: Subject to any disclaimer, the term of this patent is extended or adjusted under 35 U.S.C. 154(b) by 343 days.

(21) Appl. No.: 10/847,445

(22) Filed: May 18, 2004

(65) Prior Publication Data
US 2007/0052951 A1    Mar. 8, 2007

(51) Int. Cl.
*G01C 1/00* (2006.01)
(52) U.S. Cl. ............................. 356/139.03; 356/139.01; 356/139.02
(58) Field of Classification Search ............ 356/139.03
See application file for complete search history.

(56) References Cited

U.S. PATENT DOCUMENTS

| | | | | |
|---|---|---|---|---|
| 5,196,900 | A * | 3/1993 | Pettersen | 356/141.4 |
| 6,031,601 | A * | 2/2000 | McCusker et al. | 356/5.01 |
| 6,246,468 | B1 * | 6/2001 | Dimsdale | 356/4.02 |
| 2002/0085193 | A1 * | 7/2002 | Ohtomo et al. | 356/4.01 |

* cited by examiner

Primary Examiner—Thomas H. Tarcza
Assistant Examiner—Luke D. Ratcliffe
(74) Attorney, Agent, or Firm—Oliff & Berridge, PLC

(57) ABSTRACT

The invention relates to ground-based surveying on a site (2) which comprises an unstable zone (60) and at least one control point (FCP1, FCP2, FCP6, FCP7; CP1–CP3) placed outside the unstable zone, in which method at least one surveying device (TS8, TS9; ST1–ST3) is used to acquire positional data by sighting least one control point (FCP1, FCP2, FCP6, FCP7; CP1–CP3). The approach comprises:
 providing at least one sighting point (UP3–UP5; A–C) within the unstable zone (60; 20),
 using the surveying device(s) (TS8, TS9; ST1–ST3) to acquire positional data by sighting the at least one sighting point (UP3–UP5; A–C) that is located within the unstable zone (60; 20), and
 combining the positional data acquired from: i) the at least one control point (FCP1, FCP2, FCP6, FCP7; CP1–CP3) placed outside the unstable zone and ii) at least one sighting point (UP3–UP5; A–C) within the unstable zone (60; 20), to produce a positional reference for the surveying device(s).

The combining step can be implemented using a bundle adjustment technique.

28 Claims, 11 Drawing Sheets

$$\begin{vmatrix} X \\ Y \end{vmatrix} = \begin{vmatrix} a \\ b \end{vmatrix} + k \cdot \begin{vmatrix} \cos\alpha & \sin\alpha \\ -\sin\alpha & \cos\alpha \end{vmatrix} \cdot \begin{vmatrix} x \\ y \end{vmatrix}$$

$$\begin{bmatrix} X_1 \\ Y_1 \end{bmatrix} = \begin{bmatrix} 1 & 0 & x_1^8 & y_1^8 \\ 0 & 1 & y_1^8 & -x_1^8 \end{bmatrix} \cdot \begin{bmatrix} a^8 \\ b^8 \\ c^8 \\ d^8 \end{bmatrix}$$

$$\begin{bmatrix} X_4 \\ Y_4 \end{bmatrix} = \begin{bmatrix} 1 & 0 & x_4^8 & y_4^8 \\ 0 & 1 & y_4^8 & -x_4^8 \end{bmatrix} \cdot \begin{bmatrix} a^8 \\ b^8 \\ c^8 \\ d^8 \end{bmatrix}$$

Fig. 6b $$\begin{bmatrix} X_4 \\ Y_4 \end{bmatrix} = \begin{bmatrix} 1 & 0 & x_4^9 & y_4^9 \\ 0 & 1 & y_4^9 & -x_4^9 \end{bmatrix} \cdot \begin{bmatrix} a^9 \\ b^9 \\ c^9 \\ d^9 \end{bmatrix}$$

Fig. 6c $$\begin{bmatrix} 0 \\ 0 \\ 0 \\ 0 \end{bmatrix} = \begin{bmatrix} 1 & 0 & x_4^8 & y_4^8 & 0 & 0 & 0 & 0 & -1 & 0 \\ 0 & 1 & y_4^8 & -x_4^8 & 0 & 0 & 0 & 0 & 0 & -1 \\ 0 & 0 & 0 & 0 & x_4^9 & y_4^9 & 0 & 0 & -1 & 0 \\ 0 & 0 & 0 & 0 & y_4^9 & -x_4^9 & 0 & 0 & 0 & -1 \end{bmatrix} \cdot \begin{bmatrix} a^8 \\ b^8 \\ c^8 \\ d^8 \\ a^9 \\ b^9 \\ c^9 \\ d^9 \\ X_4 \\ Y_4 \end{bmatrix}$$

Fig. 6d $$\begin{bmatrix} X_1 \\ Y_1 \\ X_2 \\ Y_2 \\ 0 \\ 0 \\ 0 \\ 0 \\ 0 \\ 0 \\ 0 \\ 0 \\ X_7 \\ Y_7 \\ X_6 \\ Y_6 \\ 0 \\ 0 \\ 0 \\ 0 \end{bmatrix} = \begin{bmatrix} x_1^8 & y_1^8 & 1 & 0 & 0 & 0 & 0 & 0 & 0 & 0 & 0 & 0 & 0 & 0 \\ y_1^8 & -x_1^8 & 0 & 1 & 0 & 0 & 0 & 0 & 0 & 0 & 0 & 0 & 0 & 0 \\ x_2^8 & y_2^8 & 1 & 0 & 0 & 0 & 0 & 0 & 0 & 0 & 0 & 0 & 0 & 0 \\ y_2^8 & -x_2^8 & 0 & 1 & 0 & 0 & 0 & 0 & 0 & 0 & 0 & 0 & 0 & 0 \\ x_5^8 & y_5^8 & 1 & 0 & 0 & 0 & 0 & 0 & -1 & 0 & 0 & 0 & 0 & 0 \\ y_5^8 & -x_5^8 & 0 & 1 & 0 & 0 & 0 & 0 & 0 & -1 & 0 & 0 & 0 & 0 \\ x_4^8 & y_4^8 & 1 & 0 & 0 & 0 & 0 & 0 & 0 & 0 & -1 & 0 & 0 & 0 \\ y_4^8 & -x_4^8 & 0 & 1 & 0 & 0 & 0 & 0 & 0 & 0 & 0 & -1 & 0 & 0 \\ x_3^8 & y_3^8 & 1 & 0 & 0 & 0 & 0 & 0 & 0 & 0 & 0 & 0 & -1 & 0 \\ y_3^8 & -x_3^8 & 0 & 1 & 0 & 0 & 0 & 0 & 0 & 0 & 0 & 0 & 0 & -1 \\ 0 & 0 & 0 & 0 & x_5^9 & y_5^9 & 1 & 0 & -1 & 0 & 0 & 0 & 0 & 0 \\ 0 & 0 & 0 & 0 & y_5^9 & -x_5^9 & 0 & 1 & 0 & -1 & 0 & 0 & 0 & 0 \\ 0 & 0 & 0 & 0 & x_7^9 & y_7^9 & 1 & 0 & 0 & 0 & 0 & 0 & 0 & 0 \\ 0 & 0 & 0 & 0 & y_7^9 & -x_7^9 & 0 & 1 & 0 & 0 & 0 & 0 & 0 & 0 \\ 0 & 0 & 0 & 0 & x_6^9 & y_6^9 & 1 & 0 & 0 & 0 & 0 & 0 & 0 & 0 \\ 0 & 0 & 0 & 0 & y_6^9 & -x_6^9 & 0 & 1 & 0 & 0 & 0 & 0 & 0 & 0 \\ 0 & 0 & 0 & 0 & x_3^9 & y_3^9 & 1 & 0 & 0 & 0 & 0 & 0 & -1 & 0 \\ 0 & 0 & 0 & 0 & y_3^9 & -x_3^9 & 0 & 1 & 0 & 0 & 0 & 0 & 0 & -1 \\ 0 & 0 & 0 & 0 & x_4^9 & y_4^9 & 1 & 0 & 0 & 0 & -1 & 0 & 0 & 0 \\ 0 & 0 & 0 & 0 & y_4^9 & -x_4^9 & 0 & 1 & 0 & 0 & 0 & -1 & 0 & 0 \end{bmatrix} \cdot \begin{bmatrix} c_8 \\ d_8 \\ a_8 \\ b_8 \\ c_9 \\ d_9 \\ a_9 \\ b_9 \\ X_5 \\ Y_5 \\ X_4 \\ Y_4 \\ X_3 \\ Y_3 \end{bmatrix}$$

Fig. 6e

[Station TS1]   Data File SIB 8.61c
1,   110.0000,   350.1900,   0.0000
2,   162.7500,   275.3400,   0.0000
5,   100.1500,   232.1200,   0.0000
4,   73.8200,   264.2900,   0.0000
3,   49.7400,   298.8700,   0.0000

[Station TS2]   Data File SIB 9.61c
5,   120.0000,   290.4900,   0.0000
7,   171.4950,   246.5600,   0.0000
6,   121.1600,   176.4800,   0.0000
3,   69.2500,   224.0100,   0.0000
4,   96.0800,   256.4900,   0.0000

[Points Coordinates]    Data File SIBREF.xyz
1,    71.2300,    350.1100,    0.0000
2,    162.8000,    349.7100,    0.0000
6,    73.8600,    201.0100,    0.0000
7,    160.0000,    205.9800,    0.0000

[Station Name definition file]   Data File SIBELG.sta
SIB8, SIB8.blc
SIB9, SIB9.blc

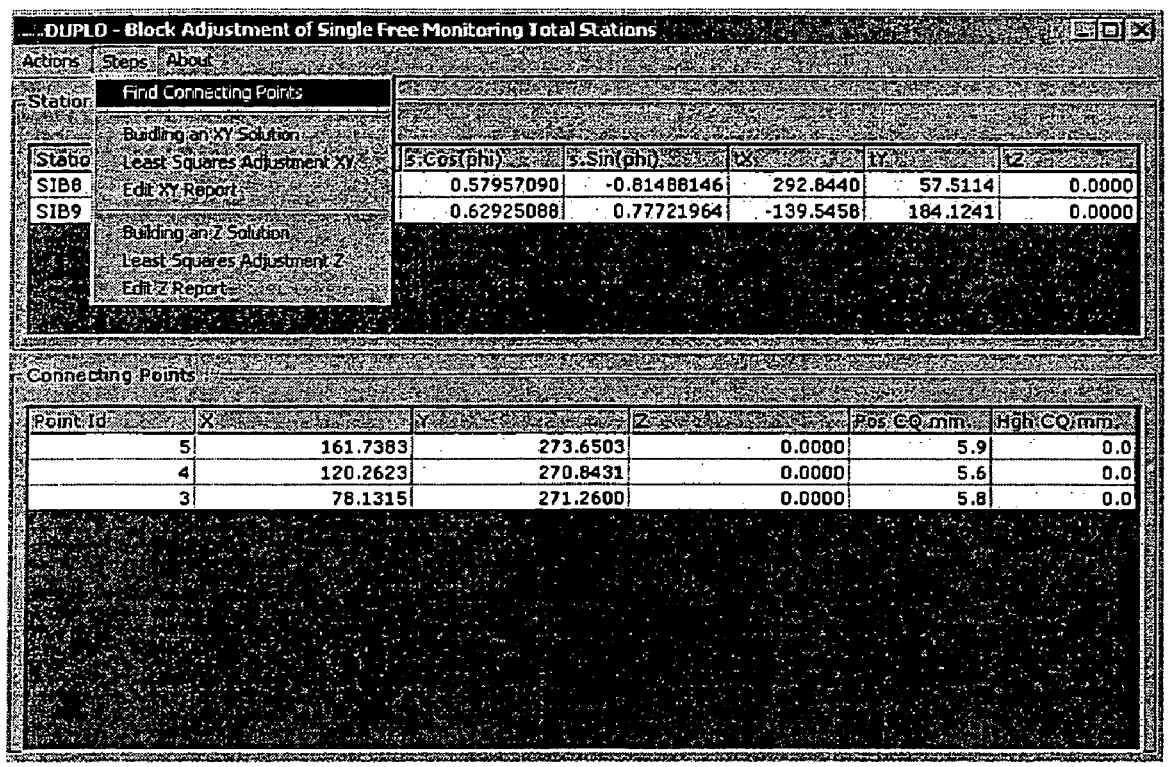

Fig. 11

2D LEAST SQUARES ADJUSTMENT RESULTS
Observation Equations Model

Number of Stations : 2
Number of Connecting Points : 3
Number of Equations : 20
Number of Unknowns : 14
Degree of Freedom : 6

CORRECTION ANALYSIS
Number of positive corrections : 11
Number of negative corrections : 9
Number of zero corrections : 0
Maximum correction : 0.0037 m.
Minimum correction : -0.0035 m.
Variance Factor : 1.43E-05
A posteriori Standard Deviation : 0.0038 m.

Fig. 12

STATIONS PARAMETERS
$X = a.x + b.y + c$
$Y = b.x - a.y + d$

STATION SIB8
Bias Scale Factor : 32.89 mm./Km
Rotation Angle Hz0 : 360.64254 gons.

a : 0.57957090
b : -0.81488146
c : 292.8440 m.
d : 57.5114 m.

| Point Id. | X m. | Y m. |
|---|---|---|
| 1 | 71.2335 | 350.1083 |
| 2 | 162.7997 | 349.7125 |
| 5 | 161.7378 | 273.6518 |
| 4 | 120.2629 | 270.8408 |
| 3 | 78.1282 | 271.2600 |

Fig.13

STATION SIB9

Bias Scale Factor : -13.52 mm./Km
Rotation Angle Hz0 : 43.32695 gons.

a : 0.62925088
b : 0.77721964
c : -139.5458 m.
d : 184.1241 m.

| Point Id. | X m. | Y m. |
|---|---|---|
| 5 | 161.7388 | 273.6488 |
| 7 | 159.9989 | 205.9829 |
| 6 | 73.8580 | 201.0063 |
| 3 | 78.1348 | 271.2601 |
| 4 | 120.2617 | 270.8454 |

Fig.14

CONNECTING POINT UP 5

Xc : 161.7383
Yc : 273.6503
Hm : 5.9 mm.

CONNECTING POINT UP4

Xc : 120.2623
Yc : 270.8431
Hm : 5.6 mm.

CONNECTING POINT UP3

Xc : 78.1315
Yc : 271.2600
Hm : 5.8 mm.

Hm is the Helmert Criterion which provides a global quality indicator.

Fig.15

CORRECTION AFTER ADJUSTMENT

| Station | Target | Xc mm. | Yc mm. |
|---|---|---|---|
| SIB8 | 1 | 3.5 | -1.7 |
| SIB8 | 2 | -1.7 | -0.3 |
| SIB8 | 5 | -0.3 | 2.5 |
| SIB8 | 4 | 2.5 | -0.5 |
| SIB8 | 3 | -0.5 | 1.5 |
| SIB9 | 5 | 1.5 | 0.6 |
| SIB9 | 7 | 0.6 | -2.3 |
| SIB9 | 6 | -2.3 | -3.3 |
| SIB9 | 3 | -3.3 | 0.0 |
| SIB9 | 4 | 0.0 | 0.5 |

END of Processing

Fig.16

METHOD AND APPARATUS FOR GROUND-BASED SURVEYING IN SITES HAVING ONE OR MORE UNSTABLE ZONE(S)

The present invention relates to the general field of ground-based site surveying, and more particularly addresses the problem of ground-based surveying in sites having one or more unstable zone(s).

Ground-based surveying in sites containing unstable zones can be necessary when it is the instability itself of the zone that needs to be monitored. This is the case, for instance, when it is required to check for spurious movements in human-made structures, such as buildings, bridges, dams, roads, underground structures, etc, e.g. to detect dangerous levels of movement in all or a part of the structure. The unstable zone to be monitored can also be natural, for instance an overhanging rock face, a glacier, a ground area subject to landslides, land subject to erosion, etc.

In other applications, it may simply be necessary to determine the overall contour of a site which happens to contain moving zones that also need to be mapped.

In general, ground-based surveying of a site is conducted by initially installing a number of control points whose geographic positions are accurately determined and mapped on a pre-established coordinate system covering the site, and typically corresponding to a geographical (ordnance) map coordinate grid system. These control points can be sighted by a displaceable surveying apparatus to allow the latter to identify its own absolute position on that coordinate system. In this way, the surveying apparatus, after having determined positions of sighted known points in terms its own, local, coordinate system, can situate its local coordinate on the pre-established coordinate system.

Clearly, the accuracy with which a surveying apparatus can be positioned on the pre-established coordinate system depends directly on the positioning accuracy of the control points themselves. For this reason, it is important for the latter to be placed on stable ground. Also, as the absolute position of the surveying apparatus is generally determined by triangulation techniques, it is desirable to sight as many control points as possible and have those control points located over a broad azimuthal angle range.

However, the presence of unstable zones within a site to be surveyed does not make it always possible to meet this requirement, given that control points placed in the unstable zones will lose their positioning accuracy over time due to drifts.

Nowadays, the aforementioned displaceable surveying apparatus usually takes the form of a motorised total station, or a network of such stations cooperating over a site.

A total station is effectively a combination of an electronic theodolite and distance meter. As such, it provides the following topographical information of a sighted remote point with respect to its measurement position: slope distance, horizontal angle (also known as azimuthal angle) and vertical angle. Modern motorised, automated, laser-based total stations, when used with appropriate surveying protocols, can yield relative positions with millimeter accuracy at ranges of several hundreds of meters, and are thus well capable of detecting positional drifts in many applications.

A total station, or more generally any theodolite, can be considered as a dual axis system supporting the line of sight of a transit/telescope. For reducing the effect of the mechanical misalignments on the observations, classical operational procedures have been applied since the first use of such instruments.

Today, a total station can take these axis misalignments into account using an inbuilt dual axis compensator and special firmware to correct the resulting error in the measurements. However, the operational range of compensators is restricted, typically to about six minutes of arc range. The operator aligns the main axis coarsely by keeping the bubble of the station inside the graduation. In case of a compensator "out of range" signal, the station must be realigned manually. This procedure, known by experienced operators, is simply inappropriate when operating a total station remotely for long periods of time.

The basic concept of surveying using a total station in the general case of a stable environment is illustrated schematically in FIG. 1. At an initial phase, a number of control points CP1–CP4 (four in the example illustrated) are positioned at scattered locations at a site 2 to be surveyed. The exact location of each control point is determined and logged in terms of X,Y,Z coordinate values on a specified a grid coordinate system, typically the grid coordinates of a geographical map. A total station TS can then sight a number of these control points to determine its absolute position on that X,Y,Z coordinate system using standard triangulation techniques. Typically, a control point is materialised by a fixedly-mounted support for a concave mirror 4 or other form of optical target for returning the laser beam from the total station TS.

In operation, the total station operator determines the aforementioned range and angle data successively for each control point CP1–CP4. These values are stored in the total station's microcomputer together with the absolute position data for the respective control points, the latter position data being pre-loaded into the total station. The total station then implements an algorithm, generally known as a free-station algorithm, to determine its absolute position from the sightings of those control points. A known example of such a free-station algorithm is the software module installed on total stations produced by Leica Geosystems AG of Switzerland and also implemented on the GeoMos (registered trademark) software. The positioning accuracy of a total station is proportional to the number of control points it can exploit from its location, the angular distribution of those controlled points, as well as the stability of the site at which they are placed.

This can lead to a problem in environments where too few control points can be installed on a stable site. Such a situation can occur notably where several total stations are operated in a same general area, calling for a correspondingly higher number of control points to serve the environment they occupy.

FIG. 2 illustrates schematically an example where the above problem arises from the presence of an unstable zone 6 (indicated in hatched lines) located centrally within a site 2 where a number of total stations TS1–TS3 (three in the example) need to be positioned. The control points CP1–CP6, having to be stably fixed, must be located outside that unstable zone 6. This has for consequence firstly that the control points are fewer in number, and secondly that they cannot be disposed with the desired angular distribution around a given total station. In the example, the stable portion of the site 2 accommodates just six control points CP1–CP6, with only two respective control points accessible for sighting by any one of the total stations TS1–TS3. Moreover, for each total station, the angular distribution of the two accessible control points is substantially reduced, being well below 180° in a horizontal circle around the total station. As a result, the position of the total stations may not be determined with the required accuracy or reliability.

In view of the foregoing, the present invention provides a new position determination approach which allows the use of points at unstable zones to contribute positioning data— and thereby act effectively as control points themselves—in conjunction with control points at stable portions of the site. In the preferred embodiments, this is achieved by acquiring position data for the points at the unstable zones, preferably from more than one surveying location, and by a form of triangulation technique referred to as "bundle adjustment" or "block adjustment". The technique of bundle adjustment is known in itself, but in the different field of aerial photography (photogrammetry), where the position determination is made from a location moving relative to the ground.

More particularly, the invention relates, according to a first aspect, to a method of ground-based surveying on a site which comprises an unstable zone and at least one control point placed outside the unstable zone, in which method at least one surveying device is used to acquire positional data by sighting least one control point, characterised in that it further comprises the steps of:

providing at least one sighting point within the unstable zone, using the surveying device(s) to acquire positional data by sighting the at least one sighting point that is located within the unstable zone, and combining the positional data acquired from: i) the at least one control point placed outside the unstable zone and ii) at least one sighting point within the unstable zone to produce a positional reference for the surveying device(s).

Preferably, more than one surveying device is used, and a plurality of surveying devices sight in common at least one common sighting point that is located in the unstable zone, and the positional data from the common sighting point(s) acquired by the surveying devices are used as positional data in the combining step.

The combining step can comprise performing a bundle adjustment.

The combining step can comprise performing a least squares adjustment on the positional data.

The positional reference can be the coordinate system of the control point(s) placed outside the unstable zone, the combining step converting the positional data of the sighting point(s) within the unstable zone into positional data of the coordinate system of the control point(s).

The surveying device(s) can be used without resorting to a physical alignment of its/their main axis with respect to the direction of gravity, the method comprising a step of computing rotational angles of the mechanical axis of the device(s).

The surveying device(s) can be used in a full three-dimensional reference frame.

The method can further comprise a step of associating a GPS (global positioning by satellite) device with at least one sighting point within the unstable zone to acquire coordinate values thereof, wherein the aforementioned coordinate values are exploited in the combining step.

In one embodiment, the method can comprise:

providing at least one sighting control point accessible for sighting from the site and located outside the unstable zone, the control point(s) having at least one known position coordinate in a first coordinate system, using at least one surveying device placed at a chosen location in the site to obtain at least one relative coordinate value of at least one the control point relative to the location of the surveying device, providing at least one sighting point within the unstable zone, using the at least one surveying device at the chosen location to obtain relative coordinate data of the sighting point(s) within the unstable zone relative to the location of the surveying device, and determining the position(s), in the first coordinate system, of the sighting point(s) located in the unstable zone on the basis of:

the relative coordinate(s) of the sighting point(s) located in the unstable zone relative to the chosen location(s), the relative coordinate(s) of the control point(s) outside the unstable zone relative to the chosen location(s), and the position coordinate(s) of the control point(s) outside the unstable zone in the first coordinate system.

Advantageously, the number of sighting control point(s) used is established to be equal to, or greater than, the minimum to keep a datum fixed, this minimum being available for the network of sighting points used in the surveyed site.

The sighting points are typically surveying points.

Advantageously, the position combining step is implemented using a bundle adjustment technique.

Preferably, at least one sighting point within the unstable zone is sighted from more than one chosen location of a surveying device, thereby to acquire a respective relative position value of that sighting point from each chosen location, and the respective relative position values are used in the position combining step.

Preferably, at least one sighting point within the unstable zone is sighted as a common sighting point by a plurality of surveying devices at different locations of the site, and position data indicating the position of that common sighting point relative to the position of each the plurality of surveying devices is used in the position combining step.

The combining step can implement a model adjusted by a least squares method.

Advantageously, the model is used to provide:
coordinates for at least one sighting point located in the unstable zone, and
parameters of the surveying device at the chosen location.

The combining step can take as position parameters only the coordinates of at least one sighting point in a coordinate system of the surveying device.

More than one surveying device can used on the site, whereby a plurality of surveying devices make sightings of a same sighting point and obtain position data of the latter within a common time frame.

Advantageously, a total station is used as the surveying device.

The combining step can be implemented with a coordinate transformation equation establishing a relationship between:
relative coordinate data of sighted points both within and outside the unstable zone, established on a relative coordinate system of the at least one surveying device, and
a skew angle between the set of axes of the first coordinate system and the relative coordinate system.

The relationship can be established in determinant form.

The relationship can comprise a first determinant containing relative coordinate data of at least one sighting point located in the unstable zone, determined from two or more surveying positions, operating as a multiplier on a column vector of numerical parameters of the surveying device(s).

According to a second aspect, the invention relates to the application of the method according to the first aspect for establishing the position of at least one sighting point located in an unstable zone in terms of a position on a coordinate grid system which also maps fixed control points, whereby the at least one sighting point located in an unstable zone is exploitable as a sighting control point.

According to a third aspect, the invention relates to the application of the method according to the first aspect for establishing the position of at least one sighting point located in the unstable zone in terms of a position on a coordinate grid system to monitor evolutions in position of the at least one sighting point.

According to a fourth aspect, the invention relates to a system for ground-based surveying on a site which comprises an unstable zone and at least one control point placed outside the unstable zone, comprising at least one surveying device arranged to acquire positional data by sighting least one control point, characterised in that it further comprises:

at least one sighting point within the unstable zone, at least one the surveying device being arranged to acquire positional data by sighting at least the sighting point within the unstable zone, and means for combining the positional data acquired from: i) the at least one control point placed outside the unstable zone and ii) at least one sighting point within the unstable zone, to produce a positional reference for the surveying device(s).

The system can be configured to execute the method according to any part of the method according to the first aspect, or its application according to the second or third aspects.

The optional features presented above in the context of the method and uses are applicable mutatis mutandis to the system according to the fourth aspect.

According to a fifth aspect, the invention relates to executable code which, when run on a data processor, executes at least the combining step of the method according to the first aspect.

According to a sixth aspect, the invention relates to executable code, which, when run on a data processor, executes calculations in respect of any part of the method according to the first aspect.

According to a seventh aspect, the invention relates to data carrier storing the executable code according to the fifth or sixth aspect.

According to an eighth aspect, the invention relates to processing an apparatus, e.g. a PC type computer or functionally equivalent device, loaded with the executable code according to the fifth, sixth or seventh aspect integrated in its software.

The invention and its advantages shall be more clearly understood upon reading the following description of the preferred embodiments, given purely as non-limiting examples, in conjunction with the appended drawings in which:

FIG. 1, already described, is a schematic diagram showing a total station set to take measurements against a set of fixedly mounted control points in a stable site, FIG. 2, already described, is a schematic diagram showing a group of total stations in the vicinity of an unstable zone and a restricted number of fixedly mounted control points available to take measurements, FIG. 3 is a schematic diagram showing a group of total stations in the vicinity of an unstable zone and operating, inter alia, on sighting points located within that unstable zone in accordance with the invention, FIG. 4a is a graph illustrating the relative positions of two coordinate systems, respectively a control points coordinate system and a theodolite (total station) coordinate system, FIG. 4b shows a mathematical expression in determinant form for converting between the control points coordinate system and the theodolite coordinate system of FIG. 4a, FIG. 5 is a schematic diagram showing two total stations in the vicinity of an unstable zone and operating, inter alia, on sighting points within that unstable zone, to illustrate a specific example of coordinate data adjustment using a bundle adjustment technique in accordance with the present invention, FIG. 6a shows a mathematical expression in determinant form giving the transformation between the control points coordinate system and the theodolite coordinate system for a point P1 on stable ground, as surveyed by total station TS8, taken from the example of FIG. 5, FIG. 6b shows a mathematical expression in determinant form giving the transformation between the control points coordinate system and the theodolite coordinate system for a point P4 on unstable ground, as surveyed by total station TS8, taken from the example of FIG. 5, FIG. 6c shows a mathematical expression in determinant form giving the transformation between the control points coordinate system and the theodolite coordinate system for the point P4 on unstable ground, as surveyed by total station TS9, taken from the example of FIG. 5, FIG. 6d shows a mathematical expression in determinant form giving the transformation with bundle adjustment between the control points coordinate system and the theodolite coordinate system for the point P4 on stable ground using the combined data from total stations TS8 and TS9, taken from the example of FIG. 5, FIG. 6e shows a mathematical expression in determinant form giving the complete mathematical for the bundle adjustment based on the fixed and unstable points used in the configuration connection with the set-up shown in FIG. 5, and based on the mathematical expressions of FIGS. 6a–6d, FIG. 7 is a schematic diagram of a network composed of two total stations, four control points and three connecting points, to illustrate by way of an example how a mathematical model according to the preferred embodiments is implemented, FIG. 8 is an example of data files produced by total stations used in the preferred embodiment of the invention, FIG. 9 is an example of point coordinate values produced from data in the preferred embodiment of the invention, FIG. 10 is a first screenshot of a Visual Basic program executed in the preferred embodiment of the invention, FIG. 11 is a second screenshot of a Visual Basic program executed in the preferred embodiment of the invention, FIG. 12 is data presentation of a processing report showing the results of applying a 2D least squares adjustment in accordance with the preferred embodiment of the invention, FIG. 13 is a presentation of station parameters for a first total station in the preferred embodiment of the invention, FIG. 14 is a presentation of station parameters for a second total station in the preferred embodiment of the invention, FIG. 15 is a presentation of the connecting points of sighting points in a moving zone of a surveyed site, in accordance with the preferred embodiment of the invention, FIG. 16 is a presentation of position corrections after bundle adjustment for the total stations use in the preferred embodiment, FIG. 17 is a schematic diagram of a configuration of total stations and points according to a second embodiment, where points within an unstable zone are also equipped with GPS antenna receivers to send their coordinate data, and FIG. 18 is a general flow chart showing some of the steps involved in the procedures used in the first and second embodiments.

A first embodiment of the invention is given with reference to FIGS. 1 to 16, and 18 where sighting points are located in stable areas and also within unstable areas. This embodiment does not use GPS (global positioning by satellite) receiver devices to acquire positional data.

A second embodiment of the invention is given with reference to FIGS. 17 and 18, which contrasts with the first embodiment inter alia by its use of one or more GPS means cooperating with one or more sighting points to contribute GPS data for the surveying application.

The flow chart of FIG. 18 is generally applicable to both the first and second embodiments, with simple adaptation to the example and implementation of the first embodiment.

FIG. 3 shows the three total stations TS1–TS3 of FIG. 2 at the same geographical location and exploiting the same six fixedly-mounted control points CP1–CP6 on stable ground, in the manner explained above in the introductory portion with reference to FIG. 2. (Specific features of the total stations and control points described in the introductory portion are applicable in the case of FIG. 3 and shall not be repeated for the sake of conciseness.)

The situation differs by the further provision of sighting points inside the unstable zone 6. To distinguish from the fixedly-mounted control points, these control points are hereafter referred to as unstable points, and given the generic abbreviation UP. In the illustrated example, seven unstable points designated UP1–UP7 are distributed substantially uniformly over the entire unstable zone 60. Any one of the unstable points can be sighted by two or more of the total stations TS1–TS3.

The provision of the unstable points in the unstable zone 60 allows each of the total stations TS1–TS3 to use these points UP as control points, as explained further. The total stations can then have access firstly to a greater number of control points (fixed and moving), and secondly to a wider angular distribution of the control points (fixed and moving), thereby potentially increasing their positioning accuracy.

Largely inspired by the analytical photogrammetry "bundle adjustment" (also known as "block adjustment") method, this approach allows the total stations to be used in a full 3D reference frame. Instead of trying to physically align physically the instrument's main axis with the direction along the gravity, the compensator is disengaged and the rotational angles of the mechanical axis are computed.

The idea is to use all—or at least some—connection points available that overlap the different measurement sub areas of the overall site to re-compute the stations' coordinates and the rotational angles of their mechanical axes. Some control points are still used to provide the coordinates in a common reference frame and to solve the datum defect issue, but those points can now be installed in a much more convenient location largely outside the unstable area.

It will be noted that in a surveying application, the minimum number of known points to be used is generally determined by what is termed the "datum". Typically for a one-dimensional (1D) network of sighting points, this minimum is one point determined in altitude (i.e. of known altitude, or z coordinate); for a two-dimensional (2D) network, this minimum is two points determined in their x and y coordinates; and for a three-dimensional network, this minimum is at least three points determined in their x, y and z coordinates, or two points determined in x and y coordinates and three points determined in z coordinate. This minimum is the minimum number of points available for the whole network, as opposed to the points available per station used in the network.

To remove the restriction of today that the total station must be located on a stable point or have available a number of high quality control points, the preferred embodiments consider this instrument as a local 3D (three dimensional) axis system. The coordinates computed by using the observations (directions and distance) are internally consistent, but transformed into the reference frame defined by the a set of control points.

For a single total station, the problem is simply a 3D transformation also known as similarity transformation or Helmert transformation, from the name of a well known German geodetic German scientist who popularised the use of the Least Square adjustment in geodesy and surveying.

When several stations are disseminated to survey all points of interest, the proposed way to avoid the multiplication of control points is to make use of common points (connection). Parameters are added to the mathematical model that relate the measurements to the common points to the transformation. The common points may be located in an area subject to deformation so long as they can be considered stable during the time of the measurement. The idea is just to keep those common points, located also directly in the unstable area, as subtantially fixed during the time of observation, which is now quite limited due to the high performance of the total stations.

If a full 3D model is considered, the only reduction to be applied to the range observations is the refraction correction. Usually the well-known Barrel and Sears formula based on the dry and wet temperatures (or the dry temperature and the relative wet air) observations, as well as the atmospheric pressure, is used. That model assumes however that the atmospheric parameters at both extremities of the range are known, which is practically impossible to achieve. Another approach proposed is to consider measure some fixed points where the distance is accurately known so that a scale factor can be directly computed and used to correct the measurements.

If the process is divided into a 2D and 1D model, the ranges are reduced to the horizontal and, if appropriate, to sea level by applying a projection correction due to the coordinate system. For a monitoring project, even one spread accross a large area, the system is still on a local grid and the projection correction can be neglected. For 1D, the height is preferably also be reduced to a reference plane.

Observing the points in the two-face position of the telescope can eliminate the remaining effect of instrumental axis misalignments. With the motorized instruments used in monitoring, this is a fast and simple procedure.

As the unstable points UP1–UP7 by definition have unknown—or at least unreliably known—position coordinates, meaningful positional information is extracted from them by the combined action of: i) sighting each one from several physically separated total stations, and ii) grouping the data acquired from those sightings with data acquired by the same total stations from sightings taken on the fixedly-mounted control points CP1–CP6.

To this end, the embodiment implements a technique of laser bundle adjustment/bundle adjustment applied to a set of points that comprises both the fixedly mounted control points CP1–CP6 and the unstable points UP1–UP7.

To recall, a (laser) bundle adjustment (also known as bundle block adjustment) can be defined, in the field of photogrammetry, as a topographical information adjustment technique that does not treat the absolute and relative orientations of sighted points separately, and where the basic unit considered is the pair of x and y coordinates of a sighted target, whereby computation leads directly to the final coordinates in a single solution.

Heretofore, bundle adjustment was strictly reserved to the field of aerotriangulation photogrammetric adjustment, where the x and y coordinates in question relate to image points on a photograph. Its purpose is classically to assemble correctly pairs of pictures having common scene elements. In that context, a bundle adjustment serves essentially to determine the 3-D coordinates of points from a 2-D image measurement.

In the new application of the bundle adjustment technique in accordance with the present invention, the absolute and relative orientations of sighted points are respectively those of the fixedly-mounted control points and those of the unstable points. All the control points are physical entities attached to the ground, and the measurements of their coordinates are also taken from static, ground-based instruments, in this case a set of total stations TS1–TS3.

The mathematical techniques covered in the literature for bundle adjustment in photogrammetric applications can be utilised in this new application with simple adaptation. For this reason, the mathematical methods and algorithms of bundle adjustment applicable to this application shall not be covered extensively in detail for reasons of conciseness.

The mathematical model used in the preferred embodiments to implement the bundle adjustment is based on a coordinate transformation equations expressed in determinant form, as explained below with reference to FIGS. 4$a$ and 4$b$.

The example covered by the following description uses a two-dimensional coordinate system (x and y coordinates) for simplification. It shall be understood that the teachings are applicable mutatis mutandis to a three-dimensional coordinate application (x, y and z coordinates) using straightforward mathematical adaptations. Likewise, the teachings are applicable mutatis mutandis to a one-dimensional application.

FIG. 4$a$ shows a first set of orthogonal axes X and Y which defines the coordinate plane against which the fixedly-mounted control points CP1–CP6 are mapped. Typically, this X,Y coordinate system, hereafter referred to as the control points coordinates system, is made to correspond to a geographical grid.

Each total station uses its own, local, coordinate system which is independent of the control points coordinate system. The local coordinate system for a particular total station is shown in FIG. 4$a$ as a second set of orthogonal axes x and y, hereafter referred to as the theodolite coordinate system (x,y), whose origin O coincides with the position of the total station. The theodolite coordinate system is at a skew (i.e. rotation) angle $\alpha$ with respect to the control points coordinate system, the skew angle being defined as the angle subtended by axis y of the theodolite coordinate system with respect to the axis Y of the control points coordinate system. The length segment joining the origin O to a point P shall be referred to as the vector OP.

There shall now be considered a common point P whose position is identified in both the control points coordinate system and the theodolite coordinate system. This would be the case for a stably-mounted control point which is pre-established and mapped on the control points coordinate system (giving the absolute position) and surveyed by the total station (giving the relative position with respect to the total station). If: a is the projection of the vector OP on the X axis of the first set of orthogonal axes X,Y, and similarly b is the projection of the vector OP on the Y axis of the first set of orthogonal axes X,Y (i.e. the intervals between the parallel dotted lines shown in FIG. 4$a$), and $\alpha$ is the skew (rotation) angle of the x,y axes of the theodolite coordinate system relative to the first set of orthogonal axes X,Y, then: the X and Y coordinate values of that control point P in the first set of orthogonal axes X,Y in terms of the theodolite coordinate system (x,y) can be expressed in determinant form, as shown in FIG. 4$b$:

$$\begin{vmatrix} X \\ Y \end{vmatrix} = \begin{vmatrix} a \\ b \end{vmatrix} + k \begin{vmatrix} \cos\alpha & \sin\alpha \\ -\sin\alpha & \cos\alpha \end{vmatrix} \cdot \begin{vmatrix} x \\ y \end{vmatrix} \quad (1)$$

where:

k is a scale factor.

From the above, the following generalised form of linear equation can be obtained directly:

$$\begin{bmatrix} X \\ Y \end{bmatrix} = \begin{bmatrix} 1 & 0 & x & y \\ 0 & 1 & y & -x \end{bmatrix} \cdot \begin{bmatrix} a \\ b \\ c \\ d \end{bmatrix} \quad (2)$$

where:

$c = k \cdot \cos \alpha$ and $d = k \cdot \sin \alpha$

The values c and d thereby include the scale factor k and the rotation angle $\alpha$.

The above mathematical expression is a construct to produce linear equations that shall be used to implement the standard least squares adjustment, as explained below.

A specific example of a surveying situation in which a bundle adjustment based on the above model can be applied is illustrated schematically in FIG. 5. In this example, two total stations designated TS8 and TS9 are situated approximately on opposite sides of an unstable zone 60 shown in hatched lines. The surrounding area of the site 2 contains four fixedly-mounted control points FCP1, FCP2, FCP6, FCP7 well outside the unstable zone 60. Total station TS8 can make a sighting on fixedly-mounted control points designated CP1 and CP2, while total station TS9 can make a sighting on fixedly-mounted control points designated CP6 and CP7.

In accordance with the invention, the unstable zone 60 is also provided with sighting points, which are considered as unstable points. The example shows three such unstable points designated UP3, UP4 and UP5, on each of which both total stations TS8 and TS9 can make a sighting.

In what follows, when a control point is considered without discriminating whether it is fixedly-mounted or unstable (also referred to as "moving"), it is designated simply by the letter "P" followed by its unique identification numeral, as indicated in FIG. 5.

The interrelation between the total stations and control points is summarised in table 1 below.

TABLE 1 control points sighted for each total station (cf. FIG. 5)

| Total station | Sighted control point | Type | Position |
|---|---|---|---|
| TS8 | P1 | fixed | known |
|  | P2 | fixed | known |
|  | P3 | moving | unknown |
|  | P4 | moving | unknown |
|  | P5 | moving | unknown |
| TS9 | P6 | fixed | known |
|  | P7 | fixed | known |
|  | P3 | moving | unknown |
|  | P4 | moving | unknown |
|  | P5 | moving | unknown |

In the algorithm used, the fixedly-mounted and unstable points are processed collectively as points P1 to P7, following the principle of bundle adjustment.

This principle can be applied to derive the positions of the different points in the cases numbered 1 to 4 below, for instance. In the equations that follow, and in FIGS. 6a–6e and 7, the numerals appearing as an index to parameters x, y, a, b, c or d correspond to the unique identification numeral (suffix 8 or 9) assigned to the corresponding total station concerned (respectively TS8 and TS9); the numerals appearing as a sub-index to parameters x, y, X or Y correspond to the numeral assigned to the corresponding sighted control point according to table 1 above.

Case 1: determination of position of a known-position point—point P1 ($X_1, Y_1$), say, from total station TS8.

The position coordinates ($X_1, Y_1$) of point P1 are derived from the determinant equation, which is a specific instance of the general form of linear equation (1) above:

$$\begin{bmatrix} X_1 \\ Y_1 \end{bmatrix} = \begin{bmatrix} 1 & 0 & x_1^8 & y_1^8 \\ 0 & 1 & y_1^8 & -x_1^8 \end{bmatrix} \cdot \begin{bmatrix} a^8 \\ b^8 \\ c^8 \\ d^8 \end{bmatrix} \quad (3)$$

as shown in FIG. 6a.

Case 2: determination of position of an unknown-position point—point P4 ($X_4, Y_4$), say, from total station TS8.

The position coordinates ($X_4, Y_4$) of point P4 are derived from the determinant equation, which is likewise a specific instance of the general form of linear equation (1) above:

$$\begin{bmatrix} X_4 \\ Y_4 \end{bmatrix} = \begin{bmatrix} 1 & 0 & x_4^8 & y_4^8 \\ 0 & 1 & y_4^8 & -x_4^8 \end{bmatrix} \cdot \begin{bmatrix} a^8 \\ b^8 \\ c^8 \\ d^8 \end{bmatrix} \quad (4)$$

as shown in FIG. 6b.

Case 3: determination of position of an unknown-position point—point P4 ($X_4, Y_4$), say, from total station TS9.

The position coordinates ($X_4, Y_4$) of point P4 are derived from the determinant equation, which is a specific instance of the general form of linear equation (1) above:

$$\begin{bmatrix} X_4 \\ Y_4 \end{bmatrix} = \begin{bmatrix} 1 & 0 & x_4^9 & y_4^9 \\ 0 & 1 & y_4^9 & -x_4^9 \end{bmatrix} \cdot \begin{bmatrix} a^9 \\ b^9 \\ c^9 \\ d^9 \end{bmatrix} \quad (5)$$

as shown in FIG. 6c.

Case 4: determination of position of an unknown-position point—point P4 ($X_4, Y_4$), say, from total station TS8 and from total station TS9.

The values of the position of point P4 given by the equations of cases 2 and 3, being based on a single total station measurement point, is subject to error.

Here, the sighting information obtained from both total stations TS8 and TS9 is combined to cancel out this error and yield the absolute position value of the unstable point P4, corrected by the combined contributions of total stations TS8 and TS9. In this way, control moving point P4 can thereafter serve as valid reference control point, by virtue of its position coordinates ($X_4, Y_4$) having been accurately determined (at least within a sufficiently short timescale within which possible drifts can be neglected).

To obtain this corrected position coordinate ($X_4, Y_4$), the solutions to the above determinant equations (3), (4) & (5) for cases 1 to 3 above are used to both construct the new determinant equation that yields implicitly the corrected coordinate values ($X_4, Y_4$) of moving point P4 and to determine the full range of values for the parameters of that equation, that set being: $x_4^8, y_4^8, x_4^9, y_4^9, a^8, b^8, c^8, a^9, b^9, d^9$.

The determinant equation that yields implicitly the corrected coordinate values ($X_4, Y_4$) of moving point P4 is given by:

$$\begin{bmatrix} 0 \\ 0 \\ 0 \\ 0 \end{bmatrix} = \begin{bmatrix} 1 & 0 & x_4^8 & y_4^8 & 0 & 0 & 0 & 0 & -1 & 0 \\ 0 & 1 & y_4^8 & -x_4^8 & 0 & 0 & 0 & 0 & 0 & -1 \\ 0 & 0 & 0 & 0 & x_4^9 & y_4^9 & 0 & 0 & -1 & 0 \\ 0 & 0 & 0 & 0 & y_4^9 & -x_4^9 & 0 & 0 & 0 & -1 \end{bmatrix} \cdot \begin{bmatrix} a^8 \\ b^8 \\ c^8 \\ d^8 \\ a^9 \\ b^9 \\ c^9 \\ d^9 \\ X_4 \\ Y_4 \end{bmatrix} \quad (6)$$

as shown in FIG. 6d.

This equation (4) effectively corresponds to a least-squares adjustment model based on bundle adjustment techniques.

It will be observed that equations (3), (4) & (5) have the general form:

[P]=[Q]·[R], where:

[P] is a column vector expressing absolute position coordinate values of a point,

[Q] is a determinant of four columns and two rows, where the first and second columns compose a unit matrix and the third and fourth columns comprise position values in the theodolite coordinate system x, y, and

[R] is a column vector comprising the parameters a, b, c and d.

By designating:

[$P_3$] the column vector [P] for the case of equation (4),

[$P_4$] the column vector [P] for the case of equation (5), it will be observed that equation (4) can be expressed as:

$$\begin{bmatrix} 0 \\ 0 \\ 0 \\ 0 \end{bmatrix} = \begin{bmatrix} 1 & 0 & & & 0 & 0 & 0 & 0 & -1 & 0 \\ & [P_3] & & & & & & & & \\ 0 & 1 & & & 0 & 0 & 0 & 0 & 0 & -1 \\ 0 & 0 & 0 & 0 & & & 0 & 0 & -1 & 0 \\ & & [P_4] & & & & & & & \\ 0 & 0 & 0 & 0 & & & 0 & 0 & 0 & -1 \end{bmatrix} \cdot \begin{bmatrix} a^8 \\ b^8 \\ c^8 \\ d^8 \\ a^9 \\ b^9 \\ c^9 \\ d^9 \\ X_4 \\ Y_4 \end{bmatrix} \quad (7)$$

The complete mathematical model derived from the above set of equations is then:

$$\begin{bmatrix} X_1 \\ Y_1 \\ X_2 \\ Y_2 \\ 0 \\ 0 \\ 0 \\ 0 \\ 0 \\ 0 \\ 0 \\ 0 \\ 0 \\ X_7 \\ Y_7 \\ X_6 \\ Y_6 \\ 0 \\ 0 \\ 0 \\ 0 \end{bmatrix} = \begin{bmatrix} x_1^8 & y_1^8 & 1 & 0 & 0 & 0 & 0 & 0 & 0 & 0 & 0 & 0 & 0 & 0 \\ y_1^8 & -x_1^8 & 0 & 1 & 0 & 0 & 0 & 0 & 0 & 0 & 0 & 0 & 0 & 0 \\ x_2^8 & y_2^8 & 1 & 0 & 0 & 0 & 0 & 0 & 0 & 0 & 0 & 0 & 0 & 0 \\ y_2^8 & -x_2^8 & 0 & 1 & 0 & 0 & 0 & 0 & 0 & 0 & 0 & 0 & 0 & 0 \\ x_5^8 & y_5^8 & 1 & 0 & 0 & 0 & 0 & -1 & 0 & 0 & 0 & 0 & 0 & 0 \\ y_5^8 & -x_5^8 & 0 & 1 & 0 & 0 & 0 & 0 & -1 & 0 & 0 & 0 & 0 & 0 \\ x_4^8 & y_4^8 & 1 & 0 & 0 & 0 & 0 & 0 & 0 & -1 & 0 & 0 & 0 & 0 \\ y_4^8 & -x_4^8 & 0 & 1 & 0 & 0 & 0 & 0 & 0 & 0 & -1 & 0 & 0 & 0 \\ x_3^8 & y_3^8 & 1 & 0 & 0 & 0 & 0 & 0 & 0 & 0 & 0 & -1 & 0 \\ y_3^8 & -x_3^8 & 0 & 1 & 0 & 0 & 0 & 0 & 0 & 0 & 0 & 0 & 0 & -1 \\ 0 & 0 & 0 & 0 & x_5^9 & y_5^9 & 1 & 0 & -1 & 0 & 0 & 0 & 0 & 0 \\ 0 & 0 & 0 & 0 & y_5^9 & -x_5^9 & 0 & 1 & 0 & -1 & 0 & 0 & 0 & 0 \\ 0 & 0 & 0 & 0 & x_7^9 & y_7^9 & 1 & 0 & 0 & 0 & 0 & 0 & 0 & 0 \\ 0 & 0 & 0 & 0 & y_7^9 & -x_7^9 & 0 & 1 & 0 & 0 & 0 & 0 & 0 & 0 \\ 0 & 0 & 0 & 0 & x_6^9 & y_6^9 & 1 & 0 & 0 & 0 & 0 & 0 & 0 & 0 \\ 0 & 0 & 0 & 0 & y_6^9 & -x_6^9 & 0 & 1 & 0 & 0 & 0 & 0 & 0 & 0 \\ 0 & 0 & 0 & 0 & x_3^9 & y_3^9 & 1 & 0 & 0 & 0 & 0 & 0 & -1 & 0 \\ 0 & 0 & 0 & 0 & y_3^9 & -x_3^9 & 0 & 1 & 0 & 0 & 0 & 0 & 0 & -1 \\ 0 & 0 & 0 & 0 & x_4^9 & y_4^9 & 1 & 0 & 0 & -1 & 0 & 0 & 0 & 0 \\ 0 & 0 & 0 & 0 & y_4^9 & -x_4^9 & 0 & 1 & 0 & 0 & -1 & 0 & 0 & 0 \end{bmatrix} \cdot \begin{bmatrix} c_8 \\ d_8 \\ a_8 \\ b_8 \\ c_9 \\ d_9 \\ a_9 \\ d_9 \\ X_5 \\ Y_5 \\ X_4 \\ Y_4 \\ X_3 \\ Y_3 \end{bmatrix} \quad (8)$$

as shown in FIG. 6e.

This complete model integrates the coordinate data of both fixed and unstable points, as acquired by the total stations, to produce the corresponding bundle adjustment. Specifically, the expression of equation (8) above comprises the following coordinate data for the fixed points:

for fixed control point FCP1 (absolute position X1, Y1): coordinate data $x_1^8$, $y_1^8$, from total station TS8, for fixed control point FCP2 (absolute position X2, Y2): coordinate data $x_2^8$, $y_2^8$, from total station TS8, for fixed control point FCP6 (absolute position X6, Y6): coordinate data $x_6^9$, $y_6^9$, from total station TS9, for fixed control point FCP7 (absolute position X7, Y7): coordinate data $x_7^9$, $y_7^9$, from total station TS9, for unstable point UP3 (absolute position X3, Y3): coordinate data $x_3^8$, $y_3^8$ and $X_3^9$, $y_3^9$ from total stations TS8 and TS9 respectively, for unstable point UP4 (absolute position X4, Y4) coordinate data $x_4^8$, $y_4^8$ and $x_4^9$, $y_4^9$ from total stations TS8 and TS9 respectively, and for unstable point UP3 (absolute position X5, Y5) coordinate data $x_5^8$, $y_5^8$ and $x_5^9$, $y_5^9$ from total stations TS8 and TS9 respectively.

After such a bundle adjustment, a conventional observations adjustment can be performed by using the coordinate values obtained by the bundle and the raw observations. The appropriateness of such a follow up by conventional observations adjustment depends on applications. In monitoring applications, it is often the case that only coordinate values are of interest.

The data acquired by the total stations TS8 and TS9 used in equation (6) can be brought together by any suitable communication means. For instance, the data acquisitions from each of the total stations TS8 and TS9 can be transmitted to a central base by a radio transmission link, that central base then carrying out the calculation for determining the absolute coordinate values $X_4$, $Y_4$ of moving point P4 using equation (6). Naturally, the aforementioned central base can also dispatch the information to another location for the calculation to be carried out.

Alternatively, one of the total stations (TS8, say) can communicate its acquired data to the other total station (TS9), which itself carries out the above-mentioned calculation using the same equation (6), and/or vice versa. This option is feasible with a modern total stations equipped with communication means, onboard calculators and software packages which can be programmed to execute such calculations. Examples of current total stations capable of effecting such a calculation are model numbers TCA1800, TCA2003, TCA1100 and TCA1200 from Leica Geosystems AG of Switzerland, used with the GeoMos software package from the same manufacturer. More information on this total station and the GeoMos software package can be found at the following website: http://www.leica-geosystems.com.

In particular, the GeoMos software package stores all the station's observations and the associated computed x,y,z coordinates (for a three-dimensional surveying application) in an SQL database, by means of which the bundle adjustment can be implemented.

The GeoMos software package accesses all the relevant information stored in the database to perform the bundle adjustment and to transform each local sets of coordinates. The latter include the coordinates used in the bundle adjustment.

The GeoMos software and the software for carrying out the bundle adjustment in accordance with the preferred embodiments are implemented in a PC that is physically separate from the total stations.

Further considerations in respect of the mathematical model used in first and second embodiments are presented below.

Observational Data

There is a large consensus in the surveying and geodetic community to handle only the measurements in the adjustment process. Even if the coordinates are directly deduced from the measurements without any reduction process, this trend is still largely promoted. For many years now, since the availability of distance measurements of the same level of quality as the angular measurements, only few practitioners have tried to promote models that deal directly with coordinates. GPS processing results have helped to motivate that change of paradigm.

In fact, it is just a transformation from polar system to Cartesian system. People involved in processing and analysis use the idea that interpretation is easier as a justification to handle measurements only. This is not the case in deformation measurements—the results are generally always expressed in the position domain. As such, in this approach the coordinates will be used as observations. In such a case several authors use the expression "pseudo-observations" to differentiate the coordinates from the measurements.

Considering the measurements (zenithal direction Vz, horizontal direction Hz and slope distance S) the point coordinates $X_p$, $Y_p$, $Z_p$ are obtained as:

$$\begin{bmatrix} X_p \\ Y_p \\ Z_p \end{bmatrix} = S \cdot \begin{bmatrix} \sin Vz \cdot \sin Hz \\ \sin Vz \cdot \cos Hz \\ \cos Vz \end{bmatrix} \quad (9)$$

In order to apply the general law of variances, we need to linearize the equations as follows: which form the content of the following matrix:

$$Q_{CC} = \begin{bmatrix} \sin Vz \cdot \sin Hz & S \cdot \cos Vz \cdot \sin Hz & S \cdot \sin Vz \cdot \cos Hz \\ \sin Vz \cdot \cos Hz & S \cdot \cos Vz \cdot \cos Hz & -S \cdot \sin Vz \cdot \sin Hz \\ \cos Vz & 0 & -S \cdot \sin Vz \end{bmatrix} \quad (10)$$

The estimation of the observation variance is introduced as:

$$Q_{LL} = \begin{bmatrix} \sigma_s^2 & 0 & 0 \\ 0 & \sigma_{Vz}^2 & 0 \\ 0 & 0 & \sigma_{Hz}^2 \end{bmatrix} \quad (11)$$

The variance covariance of the point coordinates is formulated as:

$$Q_{PP} = Q_{CC} \cdot Q_{LL} \cdot Q_{CC}^T \quad (12)$$

Functional Model

Any point (x,y,z) in a 3D Cartesian frame can be transformed into another 3D Cartesian frame (X,Y,Z) by using a similarity transformation which describes the seven degrees of freedom of a solid body in space.

The seven parameters describe the three translations ($T_x$, $T_y$, $T_z$), the three rotational angles s ($\omega,\phi,\kappa$) and "s" a scale factor.

(equation 13)

$$\begin{bmatrix} X \\ Y \\ Z \end{bmatrix} = \begin{bmatrix} T_x \\ T_y \\ T_z \end{bmatrix} + s \cdot \begin{bmatrix} \cos\phi \cdot \cos\kappa & -\cos\phi \cdot \sin\kappa & \sin\phi \\ \cos\omega \cdot \sin\kappa + \sin\omega \cdot \sin\phi \cdot \cos\kappa & \cos\omega \cdot \cos\kappa + \sin\omega \cdot \sin\phi \cdot \sin\kappa & -\sin\omega \cdot \cos\phi \\ \sin\omega \cdot \sin\kappa + \cos\omega \cdot \sin\phi \cdot \cos\kappa & \sin\omega \cdot \cos\kappa + \cos\omega \cdot \sin\phi \cdot \sin\kappa & \cos\omega \cdot \cos\phi \end{bmatrix} \cdot \begin{bmatrix} x \\ y \\ z \end{bmatrix}$$

The linearized form of this equation is:

$$X = dX + (1+ds) \cdot dR \cdot X_0 \quad (14)$$

Or in matrix form:

$$\begin{bmatrix} X_i \\ Y_i \\ Z_i \end{bmatrix} = \begin{bmatrix} x_i & 0 & z_i & -y_i & 1 & 0 & 0 \\ y_i & -z_i & 0 & x_i & 0 & 1 & 0 \\ z_i & y_i & -x_i & 0 & 0 & 0 & 1 \end{bmatrix} \cdot \begin{bmatrix} ds \\ d\omega \\ d\phi \\ d\kappa \\ dT_x \\ dT_y \\ dT_z \end{bmatrix} \quad (15)$$

If the corresponding $(X_i, Y_i, Z_i)$ is used as a connection point, it should be considered also as a part of the unknown parameters.

$$\begin{bmatrix} 0 \\ 0 \\ 0 \end{bmatrix} = \begin{bmatrix} x_i & 0 & z_i & -y_i & 1 & 0 & 0 & -1 & 0 & 0 \\ y_i & -z_i & 0 & x_i & 0 & 1 & 0 & 0 & -1 & 0 \\ z_i & y_i & -x_i & 0 & 0 & 0 & 1 & 0 & 0 & -1 \end{bmatrix} \cdot \begin{bmatrix} ds \\ d\omega \\ d\phi \\ d\kappa \\ dT_x \\ dT_y \\ dT_z \\ X_i \\ Y_i \\ Z_i \end{bmatrix} \quad (16)$$

To clarify the mechanism of building the fuctional model, the Applicant designed a small network where three connected points are observed by two stations, as shown in FIG. 7. Datum is fixed by four control points. In the figure, the three connected points are designated Point 3, Point 4 and Point 5 respectively. The four control points are designated Control Point 1, Control Point 2, Control Point 6 and Control Point 7 respectively. The stations are designated Station A and Station B respectively. To condense the functional model, the notation:

$$D_i^j = \begin{bmatrix} x_i^j & 0 & z_i^j & -y_i^j & 1 & 0 & 0 \\ y_i^j & -z_i^j & 0 & x_i^j & 0 & 1 & 0 \\ z_i^j & y_i^j & -x_i^j & 0 & 0 & 0 & 1 \end{bmatrix} \quad (17)$$

is used, where the index i relates d to the observed point, the index j relates to the station and the index k relates to the existing control points.

$$E = \begin{bmatrix} 1 & 0 & 0 \\ 0 & 1 & 0 \\ 0 & 0 & 1 \end{bmatrix} \quad (18)$$

$$F_k = \begin{bmatrix} X_k \\ Y_k \\ Z_k \end{bmatrix} \quad (19)$$

$T^j$ = the correponding transformation parameters for the station j $P_i$ = the corresponding coordinates for the point i The complete functional model now associated to our the example is:

$$\begin{bmatrix} D_1^A & 0 & -E & 0 & 0 & 0 & 0 & 0 \\ D_2^A & 0 & 0 & -E & 0 & 0 & 0 & 0 \\ D_3^A & 0 & 0 & 0 & -E & 0 & 0 & 0 \\ D_4^A & 0 & 0 & 0 & 0 & -E & 0 & 0 \\ D_5^A & 0 & 0 & 0 & 0 & 0 & -E & 0 \\ 0 & D_3^B & 0 & 0 & -E & 0 & 0 & 0 \\ 0 & D_4^B & 0 & 0 & 0 & -E & 0 & 0 \\ 0 & D_5^B & 0 & 0 & 0 & 0 & -E & 0 \\ 0 & D_6^B & 0 & 0 & 0 & 0 & 0 & -E \\ 0 & D_7^B & 0 & 0 & 0 & 0 & 0 & -E \\ 0 & 0 & E & 0 & 0 & 0 & 0 & 0 \\ 0 & 0 & 0 & E & 0 & 0 & 0 & 0 \\ 0 & 0 & 0 & 0 & 0 & 0 & E & 0 \\ 0 & 0 & 0 & 0 & 0 & 0 & 0 & E \end{bmatrix} \cdot \begin{bmatrix} T^A \\ T^B \\ P_1 \\ P_2 \\ P_3 \\ P_4 \\ P_5 \\ P_6 \\ P_7 \end{bmatrix} = \begin{pmatrix} 0 \\ 0 \\ 0 \\ 0 \\ 0 \\ 0 \\ 0 \\ 0 \\ 0 \\ 0 \\ F_1 \\ F_2 \\ F_3 \\ F_4 \end{pmatrix} \quad (20)$$

Stochastic Model

The corresponding variance covariance matrix is given for each point observed by:

For a connection point determined by at least two or more stations:

$$Q_{PP} = Q_{CC} \cdot Q_{LL} \cdot Q_{CC}^T \quad (21)$$

For existing control points, the variance (covariance) matrix is built by conditioning the elements with a near zero variance value or relaxing some of them depending of on their stability. The process of conditioning (or of relaxing) the variance covariance matrix to reduce the influence of errors in the any control points uses the variance (covariance) matrix of the form:

$$Q_{PP} = \begin{bmatrix} \sigma_X^2 & 0 & 0 \\ 0 & \sigma_Y^2 & 0 \\ 0 & 0 & \sigma_Z^2 \end{bmatrix} \quad (22)$$

If the coordinates are provided by a GPS antenna co-located with a reflector, as in the second embodiment, there will be introduced the corresponding variance (covariance) matrix obtained after the real time or post processing solution. However, it is known that GPS produce over optimistic precision estimates. Thus it is necessary to scale the diagonal of the resulting variance (covariance) matrix to give a more realistic representation of the quality of the solution. The estimation is provided essentially by the baseline range scaled by a priori estimator of the standard accuracy of the GPS receiver used.

Least Squares Adjustment

Having defined the functional and stochastic models, it is possible to process this set of linear equations using the Least Squares adjustment method to obtain estimates for all parameters including the transformation set for each station and the coordinates of all connected points.

The Least Squares adjustment method provides all the necessary statistical information that is needed to qualify the results in terms of model performance and screening of the individual observations.

The approach considered uses the B-method of testing developed by Professor Baarda and promoted by the University of Delft. This method allows for investigation of the internal and external reliability of the solution.

The use of a motorized total station equipped with automatic passive reflector recognition reduces considerably the presence of error in the observations. Automatic target recognition (ATR) and signal scan technologies significantly reduce sighting errors and enable twenty-four hour, day and night monitoring of targets up to approximately six kilometers away.

To investigate in near real time the validity of the adjustment model for each cycle of measurement, the Applicant investigated the use of a pre-adjustment using the L1 norm, which minimizes the weighted sum of the absolute residuals. The advantage of L1 norm minimization compared to the least squares is its robustness, which means that it is less sensitive to outliers, which fits very well with the requirement for high processing speed and good quality results.

A practical consideration for the monitoring network is the number of control points considered as fixed and the optimal number of connected points. For solving the normal matrix based on the functional model, we need to have its determinant strictly greater than zero. As a minimum, there shall normally be at least two control points determined in 2D and three in 1D (typically, there would be three 3D points). Additional control points increase the reliability of the solution by adding redundancy. The geometry of the control is also a consideration. As always, careful network design will have a major influence on the quality of the results that are obtained from the adjustment. However, unlike with the free station method, the proposed approach allows the control to be distributed around the area by removing the need for all TPS to be able to measure three control points.

Concerning the optimal number of connected points, this can be determined by some empirical approach, such as having at least three connected points per station. However, the best approach is to use statistical inference based on the B-method. This method provides some estimates for checking the internal reliability that can be used in a pre-design phase to verify that the connected points will provide a sufficient contribution to the strength of the network to achieve the desired results.

Another remark concerns the numerical solution of such a linear system. Modern computers have sufficient computational power and memory to easily compute easily the solution to such problems quickly. However, the structure itself of the design matrix (functional model) can help to reduce the computational burden, which is advantageous for near real time processing. The question is not how to increase the processing speed, but how to keep the numerical stability of the results well beyond the precision of the observations themselves and avoid insignificant numbers.

The Applicant has compared two different approaches, one based on the symbolic factorization of the normal matrix and one on the modified Gram-Schmidt transformation. Both deliver the same numerical stability. The Gram-Schmidt transformation requires that all of the coefficients of the functional model including the zero values are stored, but with the advantage that all the variance (covariance) values and parameters estimation are available simultaneously.

FIGS. 8 to 16 are diagrammatic representations of data files, output information, and screen shots produced and by/or exploited in the preferred embodiments.

FIG. 8 shows two data files having the same basic format, the file at the top of the figure being associated to total station TS8, and the file at the bottom of the figure being associated to total station TS9. The numerals at the lefthand column are the number suffixes of the sighting points indicated in FIG. 5. These correspond to the sighting points sighted by the respective total stations. The second, third and fourth columns correspond respectively to the x, y and z coordinate values determined for the corresponding sighting points by the total station concerned.

FIG. 11 is a second screenshot, again taken from the monitor of a PC running the algorithms for implementing the preferred embodiments, this time showing more specifically the parameters involved in finding connecting points.

FIG. 12 is a processing report on the results of a two-dimensional (2D) least squares adjustment, using the observation equations model. The top part of report indicates the parameters and boundary conditions, these being: the number of total stations, the number of connecting points, the number of equations used, the number of unknowns and the degrees of freedom.

The bottom portion of the report is a correction analysis indicating: the number of positive corrections, the number of negative corrections, the number of zero corrections, the maximum correction, in meters, the minimum correction, in meters, the variance factor, and the a posteriori standard deviation.

FIGS. 13 and 14 show the station parameters respectively for total stations TS8 and TS9. These include the values for parameters a, b, c and d defined above, the bias scale factor and the rotational angle. The bottom part of the figure shows the reference point identifications (in terms of their suffixes), together with the corresponding values for Xm and Ym in respective columns.

FIG. 13 also indicates the station parameters given by the equations X=a.x+b.y+c, Y=b.x−a.y+d.

Figure 1:
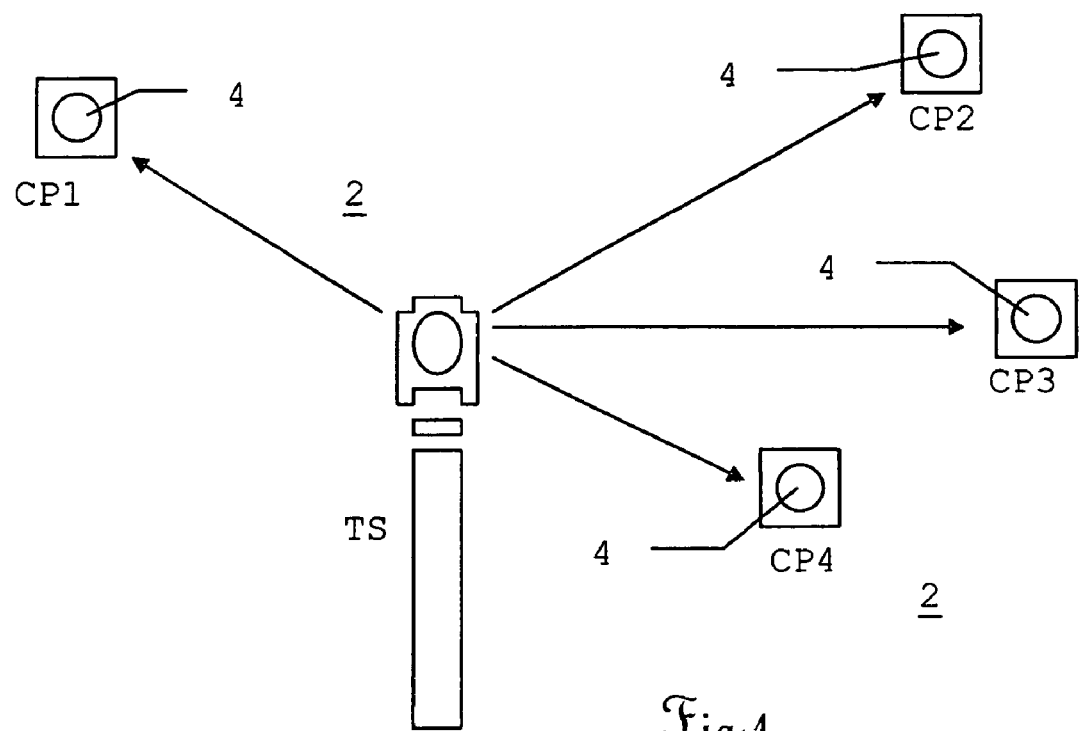
Figure 2:
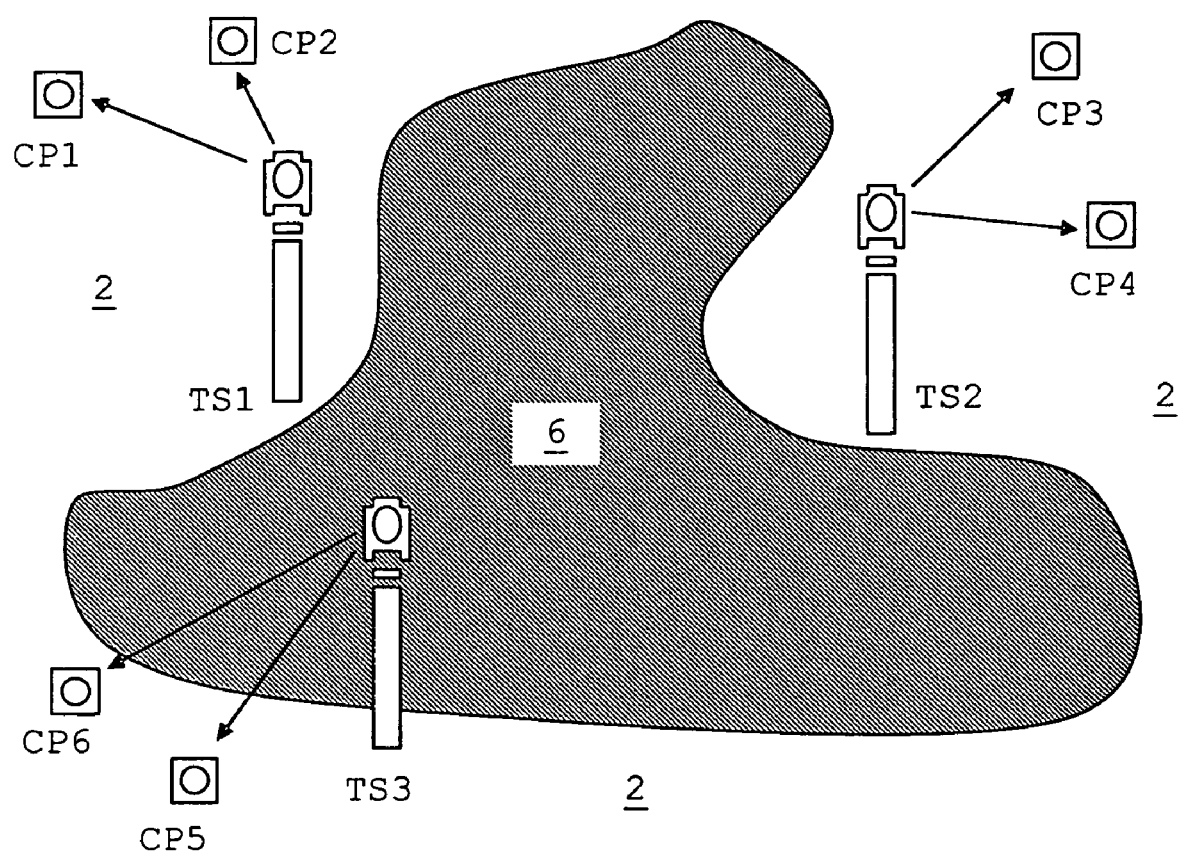
Figure 3:
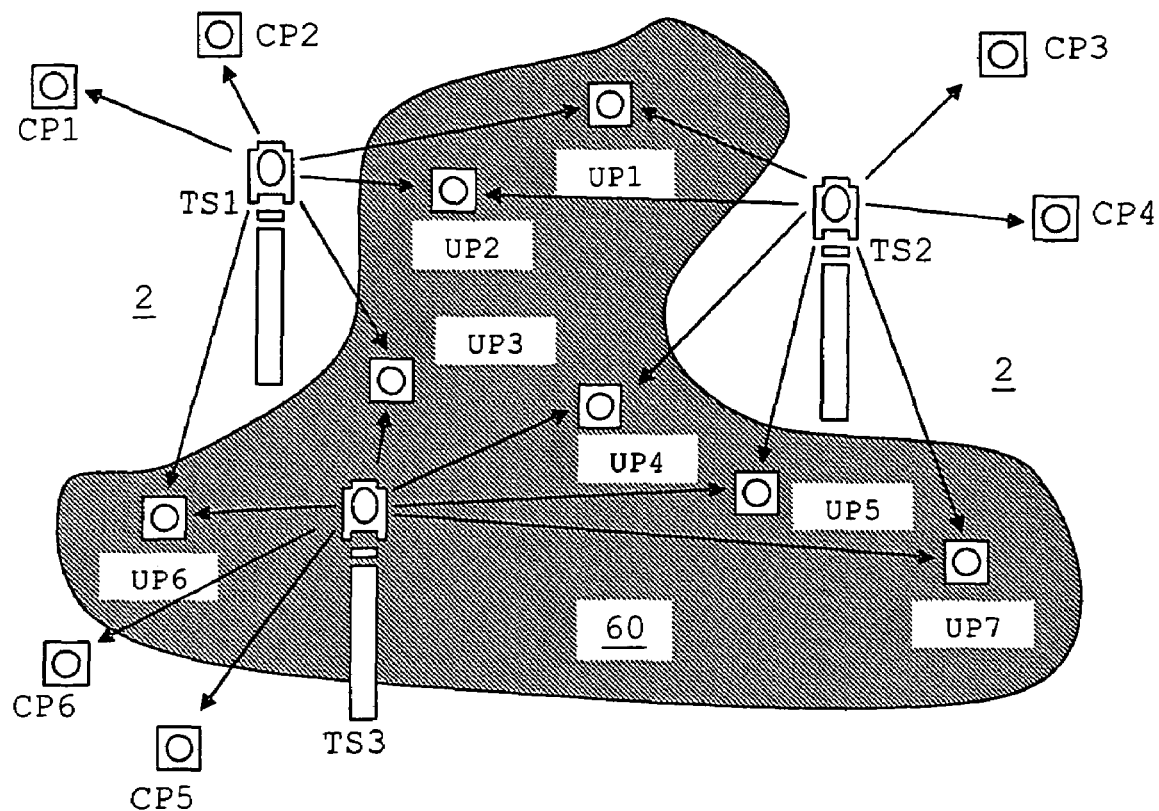
Figure 4A:
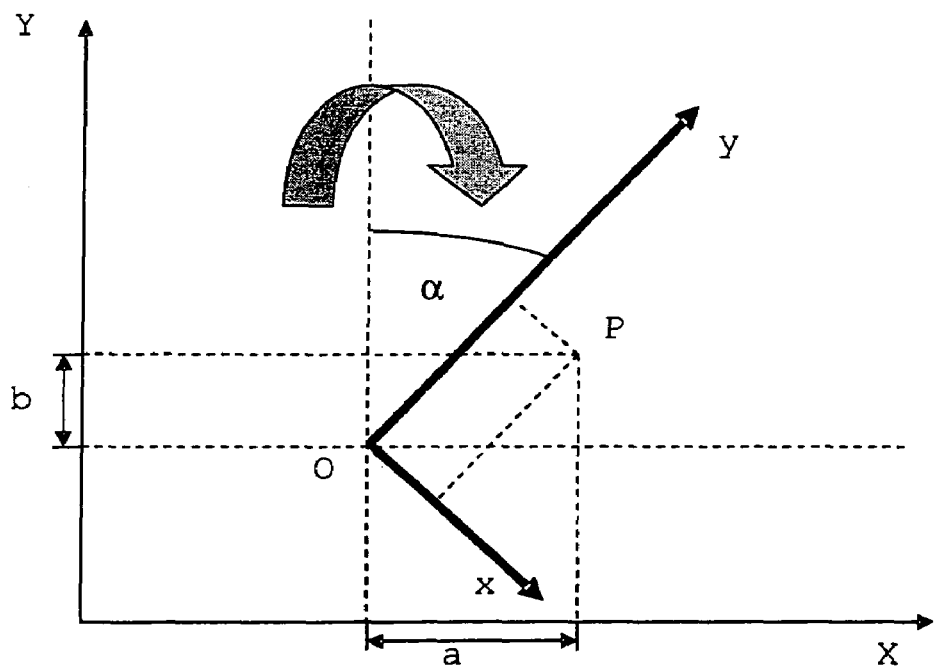
Figures 4B, 5, 6A:
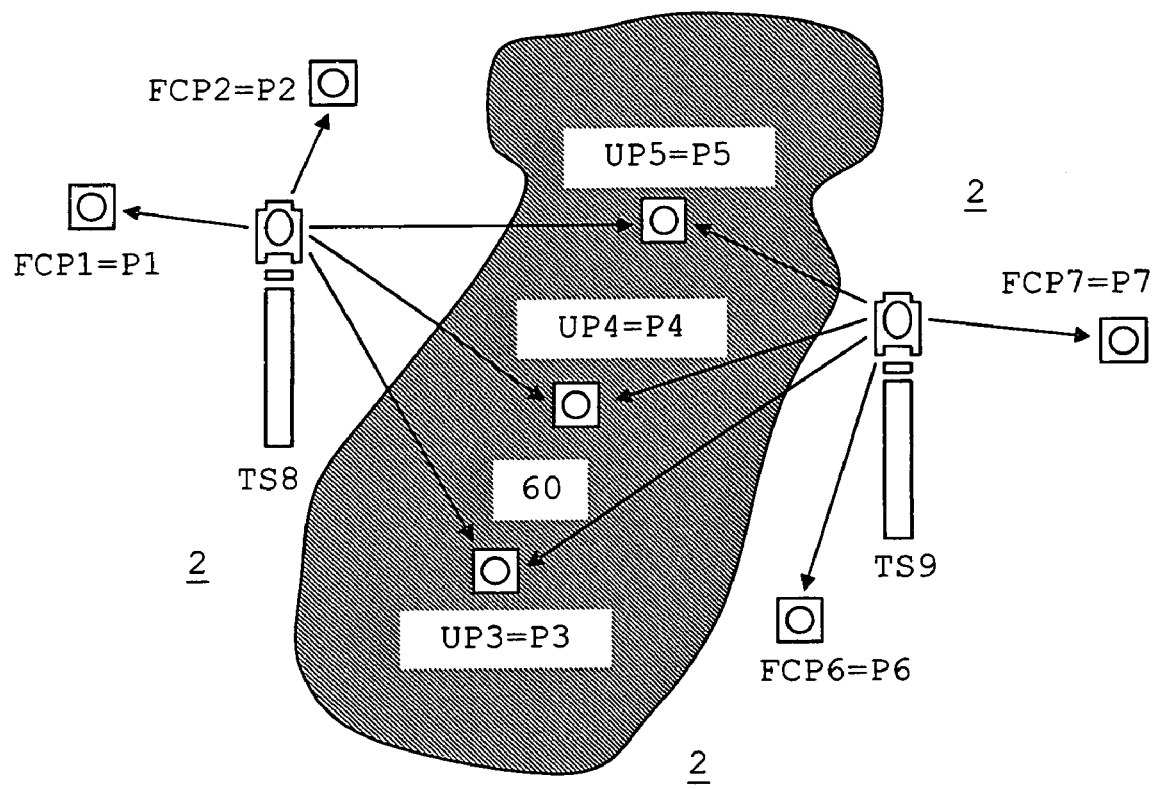
Figures 7, 8:
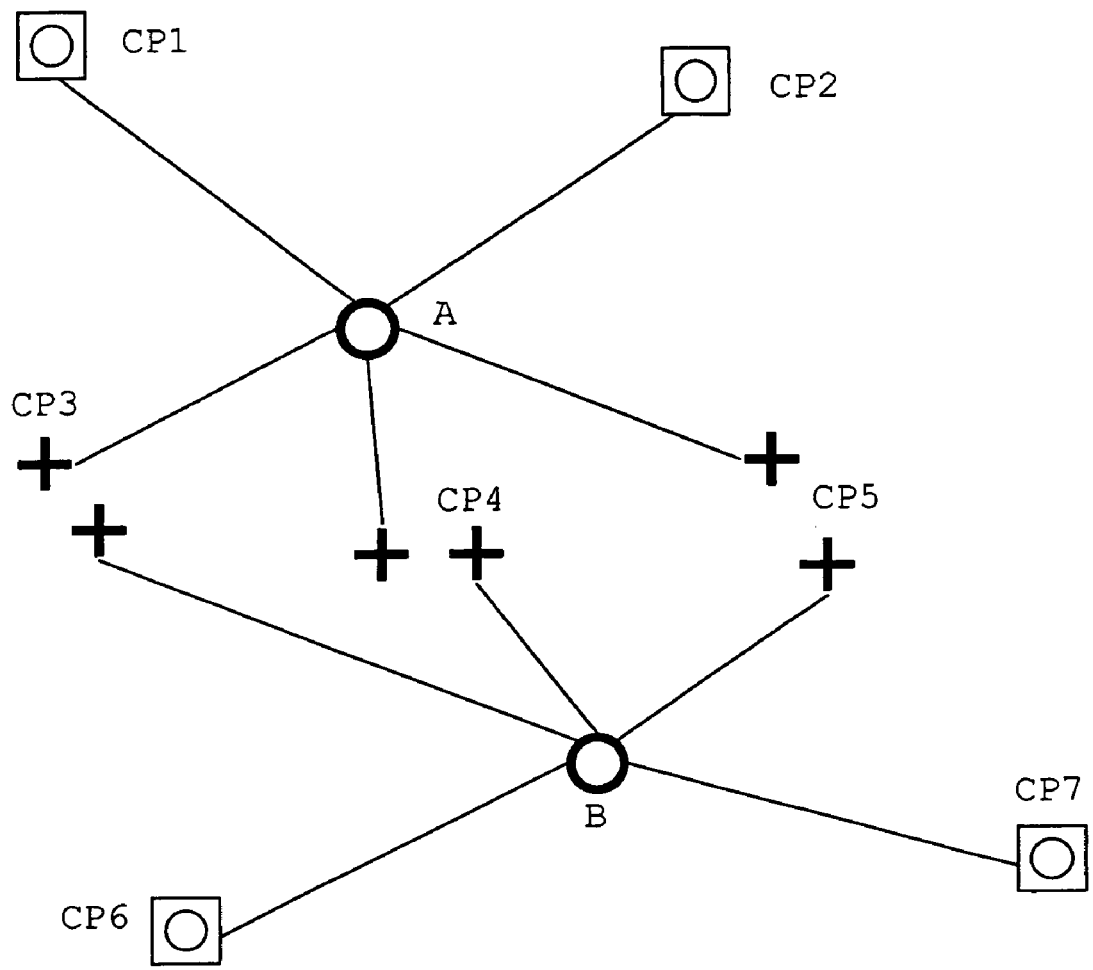
Figures 9, 10:
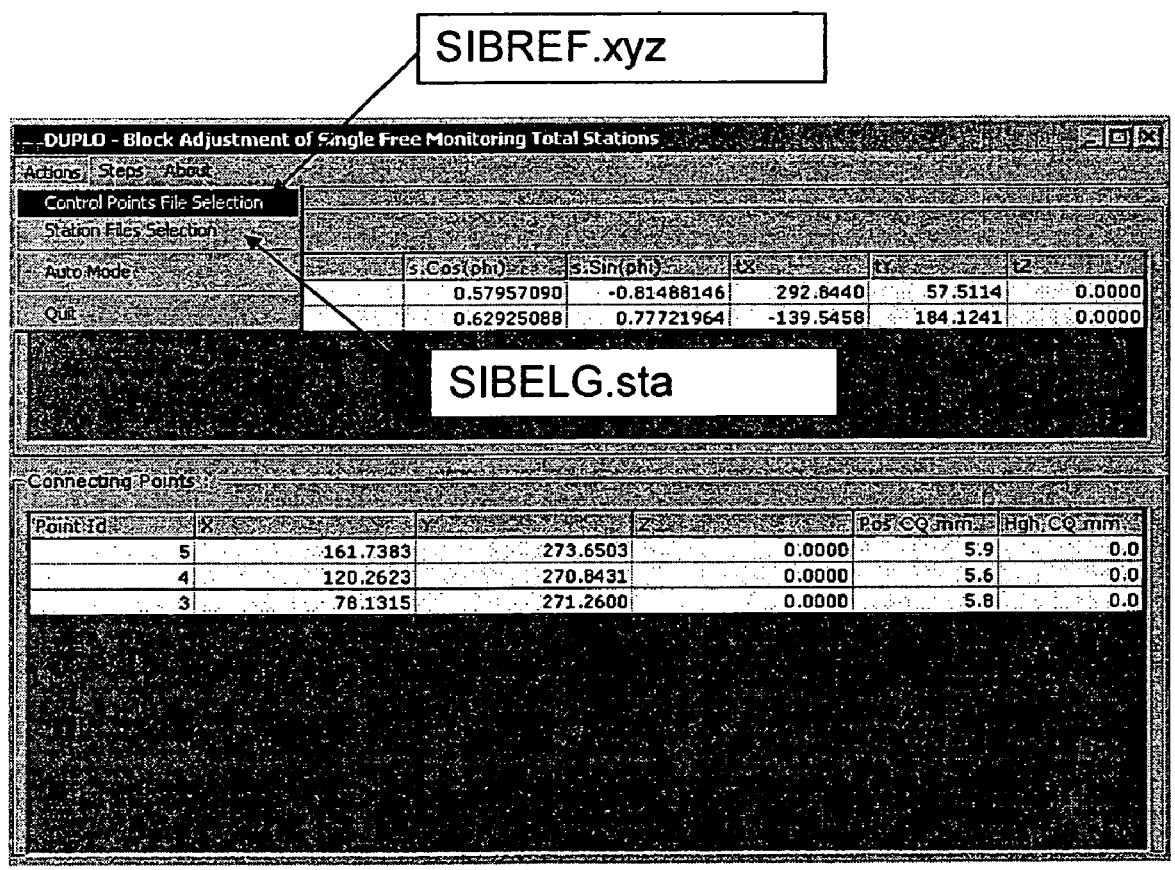
FIG. 9 shows the point coordinates of the fixed reference points, these being indicated by their suffixes on the lefthand column, the second, third and fourth columns expressing respectively the x, y and z coordinates.
FIG. 10 is a first screenshot taken from the monitor of a PC running the algorithms for implementing the preferred embodiments, showing more specifically the parameters presented onscreen in connection with a selection of control points.

FIG. 14 is a representation of the connecting points for the unstable points UP3 (P3), UP4 (P4) and UP5 (P5) identified in FIG. 5. Each connecting point is identified in terms of the parameters Xc, Yc and Hm, where Hm is the Helmert criterion, which provides a global quality indicator.

FIG. 16 is a representation of corrections after adjustment for the total stations TS8 and TS9 (in this presentation, total stations TS8 and TS9 are designated SIB8 and SIB9 respectively). The column "target" indicates the suffix of the corresponding sighting point, and the next two adjacent columns designate respectively the parameters Xc and Yc in millimeters.

Figure 17:
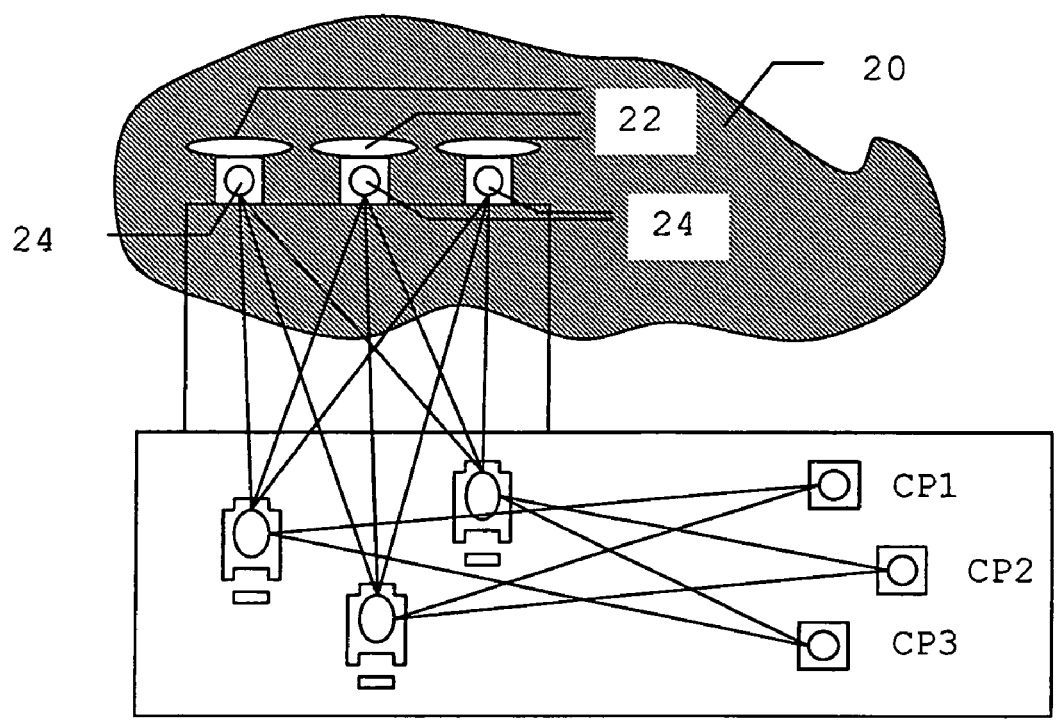

FIG. 17 is a diagrammatic representation of a implementation of the invention according to a second embodiment. In the example, three sighting points, designated A, B and C are implanted within an unstable zone 20. Each sighting point A, B and C is equipped with a GPS antenna and receiver in addition to a standard reflector 24. The GPS receiver 22 is arranged to be co-located with its associated reflector 24, which is here a spherical housing type of reflector, such that the GPS coordinate values obtained correspond substantially with those of the reflector.

The use of the precise phase-based differential GPS receivers and processing software for monitoring project is now very well accepted due to its ability to deliver centimeter or millimeters-level positions in near real time. The approach described here can also use those positions to provide active control points in the deformation area. In that case a GPS antenna is co-located with a 360° reflector and the offsets are determined. A special procedure based on the "hidden point target" used in industry and surveying has been adapted to ensure that the antenna phase centre and the 360° reflector centre coordinates are identical.

The measurement technology available today is mature enough to allow the use of advanced processing models to meet and exceed the market expectations. Practical tests have been used to verify this new approach.

Three control points, designated CP1, CP2 and CP3 are installed stably, outside the unstable zone 20.

Three motorised total stations, designated ST1, ST2 and ST3 are placed in a network outside the unstable zone and operate in strict local coordinate systems.

The example can correspond to a practical case of an underground civil engineering project, such as the construction of a railway tunnel. The total stations can by typically model TCA 1800 1" motorised total stations available from Leica Geosystems of Switzerland. The sighting points A, B and C constitute three connected points to provide a 3D transfer between their respective GPS antenna receivers 22. The three control points CP1, CP2 and CP3 are located at or near the entrance to the aforementioned tunnel.

Each total station ST1, ST2 and ST3 is initialised within a strict local reference frame (only approximate coordinates and orientation) with their compensator switched off and the total station's main axis unaligned to the gravity vertical.

The processing was used to provide a solution to bring the total station (TPS) onto a common reference frame and correct for the misalignment of the vertical axes. In this example, each total station is able to measure three control points CP1, CP2 and CP3. However, this is not a requirement since they are able to measure common points in the deformation area.

Figure 18:
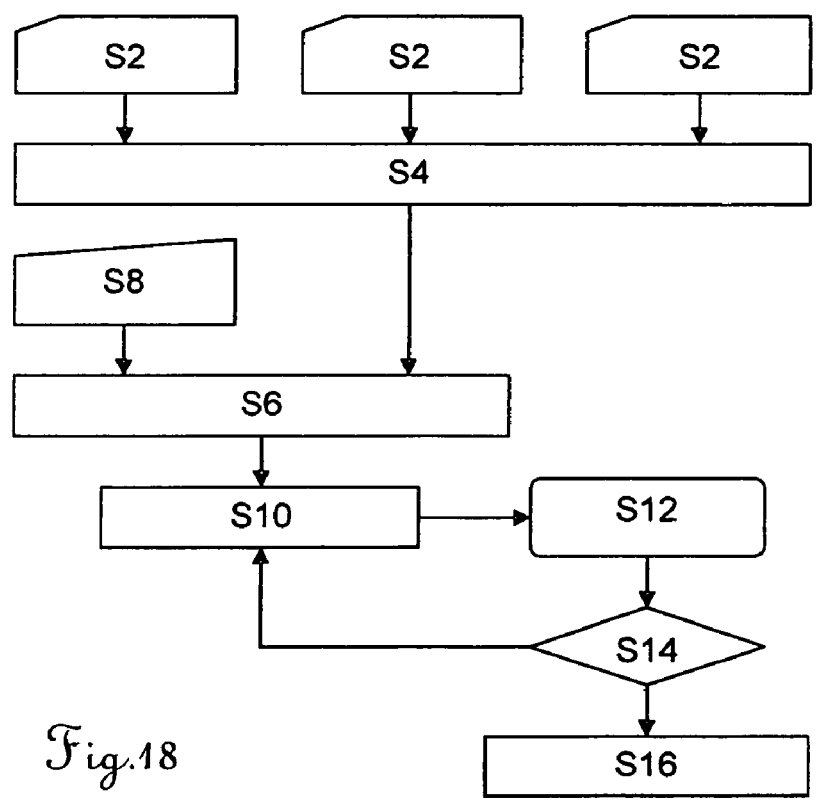

FIG. 18 is a general processing flow chart outlining the procedure which can be implemented by the embodiments.

The point coordinates are delivered from each of the total stations or equivalent used (step S2). Here, the chart takes the case of the three total stations A, B and C of FIG. 17 each depicted by a respective box.

From that data, there is performed an automatic selection and extraction of all common points observed from all stations (step S4).

The result of this automatic selection and extraction is used to create the design matrix, covariance (variance) matrix and the observation vector (step S6). For this step, there is also supplied data (step S8) in respect of the control points coordinates, which can be fixed and/or provided by the GPS receivers, if the latter are implemented and utilised.

From that matrix and observation vector creation step S6, there is carried out an Iterative Least Squares adjustment (step S10).

The result of the Least Squares Adjustment is used to update transformation parameters and all connected points coordinates (step S12).

If the Least Squares Adjustment satisfies a determined convergence criterion (step S14), then the transformation parameters are applied to all other measured (monitoring) points (step S16). If this criterion is not satisfied, the procedure returns to the Iterative Least Squares Adjustment of step S10 for another calculation cycle. The iteration is repeated until the criterion of step S14 is satisfied.

A concrete example of how this procedure is applied to the application of FIG. 17 is described below. The coordinates of the GPS antennas 22 co-located to the reflectors 22 for each of the sighting points A, B and C (here designated "GPS A", "GPS B" and "GPS C" respectively): are given in the table below.

|   | GPS A | GPS B | GPS C |
|---|---|---|---|
| X | 858.6823 | 856.6066 | 854.0894 |
| Y | 267.7642 | 262.5281 | 266.7709 |
| Z | 190.3783 | 190.3775 | 190.3957 |

In the first step the measurements from each total station (TPS) are processed independently in the reference frame of that total station. The resulting coordinates are presented in the following tables.

|   | A | B | C | 1 | 2 | 3 |
|---|---|---|---|---|---|---|
| Station 1 | | | | | | |
| X | 858.6842 | 856.5128 | 854.0738 | | 854.6375 | 856.5948 |
| Y | 297.7374 | 262.5380 | 266.8269 | | 264.1719 | 268.0451 |
| Z | 190.3813 | 190.3710 | 190.3888 | | 158.7635 | 159.1138 |
| Station 2 | | | | | | |
| X | 858.6837 | 856.6073 | 854.0906 | 858.9941 | | 856.5885 |
| Y | 297.7655 | 262.5299 | 266.7727 | 264.3069 | | 268.0375 |
| Z | 190.3780 | 190.3775 | 190.3956 | 158.7420 | | 159.1205 |
| Station 3 | | | | | | |
| X | 858.6830 | 856.6059 | 854.0890 | 858.9941 | 854.6991 | |
| Y | 297.7641 | 262.5278 | 266.7714 | 264.3043 | 264.1287 | |
| Z | 190.3783 | 190.3775 | 190.3957 | 158.7418 | 158.7700 | |

The above coordinates are then used in the network adjustment as measurements to compute the final coordinates and the transformation parameters for each total station. The results of the adjustment are summarized below.

Summary of the Adjustment

Number of Stations: 3

Number of Target points: 6

Number of equations: 54

Number of parameters: 39

Degree of freedom: 15

Variance Factor after adjustment: 3.01E-06

Standard Deviation Weight Unit: 0.0017 m.

| Parameters | Station 1 | Station 2 | Station 3 |
|---|---|---|---|
| Scale factor | 0.99976821 | 0.99988355 | 0.99986597 |
| Rotation along X | −0.00031 | −0.00033 | −0.00032 |
| Rotation along Y | 0.00068 | 0.00060 | 0.00063 |
| Rotation along Z | 0.01812 | 0.00016 | 0.00022 |
| Shift X | 4.92010 | 0.02621 | 0.05498 |
| Shift Y | 15.52807 | −0.16952 | −0.21656 |
| Shift Z | 0.70873 | 0.62505 | 0.64657 |

The final adjusted coordinates are computed as:

| Final | A | B | C | 1 | 2 | 3 |
|---|---|---|---|---|---|---|
| X | 858.6823 | 856.6066 | 854.0894 | 858.9741 | 854.6801 | 856.5676 |
| Y | 297.7642 | 262.5281 | 266.7709 | 264.2950 | 264.1178 | 268.0252 |
| Z | 190.3783 | 190.3775 | 190.3957 | 158.7449 | 158.7759 | 159.1236 |

With the corresponding a posteriori standard deviation:

| Quality | A | B | C | 1 | 2 | 3 |
|---|---|---|---|---|---|---|
| σX | 0.0000 | 0.0000 | 0.0000 | 0.0026 | 0.0026 | 0.0025 |
| σY | 0.0000 | 0.0000 | 0.0000 | 0.0021 | 0.0021 | 0.0021 |
| σZ | 0.0000 | 0.0000 | 0.0000 | 0.0017 | 0.0017 | 0.0016 |

After the processing of all coordinates, the measurements of all total stations (TPS) are brought onto a common reference frame. The results show very good coherence and a precision well within the specification of the instrument used. This practical example shows the suitability of concept notably for deformation monitoring, where the TPS may not be placed on stable control, so that changing coordinates and alignment of the vertical axis are a concern.

The concept allows the use the of automatic total stations for monitoring when no stable monuments are available to place the instruments and good control points are in short supply. The embodiments use a combination of control and common points located in the deformation area (but which can be considered fixed during the measurement phase) to compute transformation parameters to combine the measurements from multiple TPS.

This approach allows also provides a flexible way to introduce new stations into a network, even temporarily, without unnecessary long initialisation.

Considering the use of a total station unaligned to the gravity vertical, this approach introduces a new concept of analytical total station. Mixing GPS coordinates results with total station coordinates in this approach permits monitoring in areas where no stable control is available.

In summary, with todays advanced instrumentation, the users challenge is to review the mathematical models used traditionally to process the observations and take full advantage of the latest technology.

The mathematical concepts presented above in a simple case of two or thre total stations sighting in common a set of unstable points can be straightforwardly extrapolated to any number N of total stations or equivalent surveying devices sighting a group of fixed points and unstable points extended in three dimensions (x, y, z). It is not necessary for each of the N total stations to sight each of the moving or fixed points sighted by the other total stations. In the embodiment a moving point exploited in the bundle adjustment is sighted by two or more total stations, the latter also sighting at least one fixedly-mounted control point and the moving point becomes a valid control point.

The timescale over which the sightings are to be effected will depend on the estimated rate of movement of the unstable points to be used and on the accuracy required. In typical applications, the unstable points evolve in their position over very small distances—typically a few millimeters or centimeters—in a relatively long timescale, typically of the order of several weeks or months, possibly years.

It will be noted that where time constraints allow, it is possible to replace the provision of two or more total stations operating in parallel in a common timeframe at different locations by a single total station made to take sightings at those different positions. The invention has many applications for surveying from land-based apparatus, and is well-suited to surveying in the following situations:

when it is required to monitor positional drifts of an identified point, the drift being caused e.g. by progressive changes in a natural contour, for instance due to earthquakes, ground compaction, erosion etc, or in a man made structure, for instance in the case of stress-induced distortions in a dam or bridge, sinking foundations in a building, etc. Often, it is inconvenient or impossible to be physically present at such points to effect precise positional measurements at repeated time intervals to track possible positional variations. Here, the invention makes it possible to process the moving point or points to be monitored in terms of the above-described moving point(s), thereby allowing highly accurate measurements to be obtained; and/or when the presence of unstable areas in a site to be surveyed does not make it practically possible to install a sufficient number of stably-mounted control points for sighting from different surveying points in the site. Here, the invention makes it possible to install exploitable control points even on the unstable areas of the site, these unstable points nevertheless becoming effective as reference control points by virtue of the approach taught by the present invention. In this way, the total area of the site, including the moving zones, can be adequately surveyed.

The invention has many benefits including:
the fact that the coordinates of unstable points can be computed from sightings generating completely different local coordinate x y and z values,
it allows stations making the sightings to be set even with the same mutual coordinates,
it can work with a minimum number of control points and some common points located in a deformation area,
in the preferred embodiment, it can be implemented with a model adjusted by a least squares technique which provides both: i) coordinates for the common points and ii) parameters for each station,
it can be implemented as a data snooping procedure applicable to detect any unstable point measured by several stations, either simultaneously or within a predetermined timescale (in which case a same station can be used to provide sightings at different locations, as explained above),
all of the other points computed from each station can be transformed using the station's parameters,
it can be implemented a model which uses only the coordinates, and not the raw observations (angles and distance),
it can provide a model which also handles Z coordinate to provide a 2.5D modelling,
with all the coordinates in the same datum, it enables to perform a conventional 3D adjustment using the raw observations if needed.

The illustrated examples are based on an installed "network" of motorized total stations around (and on) a site for monitoring unstable points. The stations' coordinates are re-computed at given intervals by using some control points located outside the unstable zone. At least some stations can measure some selected common points in the unstable zone substantially at the same time (or within a time interval in which a movement in the unstable area is sufficiently small), as well as some control points. The thus-obtained information is used for the processing of each station.

It shall be clear to the skilled person that the invention can be implemented in many different ways and in many different applications. Depending on applications, the model can be applied in a one, two or three-dimensional coordinate system. In particular, many variations are possible as a function of the software, firmware and hardware possibilities at disposal.

The invention claimed is:

1. Method of ground-based surveying on a site (2) which comprises an unstable zone (60; 20) and at least one control point (FCP1, FCP2, FCP6, FCP7; CP1–CP3) placed outside said unstable zone, in which method at least one surveying device (TS8, TS9; ST1–ST3) is used to acquire positional data by sighting at least one control point (FCP1, FCP2, FCP6, FCP7; CP1–CP3),
characterised in that it further comprises the steps of:
providing at least one sighting point (UP3–UP5; A–C) within said unstable zone (60; 20),
using said surveying device(s) (TS8, TS9; ST1–ST3) to acquire positional data by sighting said at least one sighting point (UP3–UP5; A–C) that is located within said unstable zone (60; 20), and
combining the positional data acquired from: i) said at least one control point (FCP1, FCP2, FCP6, FCP7; CP1–CP3) placed outside said unstable zone and ii) at least one sighting point (UP3–UP5; A–C) within said unstable zone (60; 20), to produce a positional reference for said surveying device(s).

2. Method according to claim 1, wherein more than one surveying device (TS8, TS9; ST1–ST3) is used, and wherein a plurality of surveying devices sight in common at least one common sighting point (UP3–UP5; A–C) that is located in said unstable zone (60; 20), and wherein said positional data from the common sighting point(s) acquired by said surveying devices are used as positional data in said combining step.

3. Method according to claim 1, wherein said combining step comprises performing a bundle adjustment.

4. Method according to claim 1, wherein said combining step comprises performing a least squares adjustment on said positional data.

5. Method according to claim 1, wherein said positional reference is the coordinate system of said control point(s) (FCP1, FCP2, FCP6, FCP7; CP1–CP3) that are placed outside said unstable zone, said combining step converting the positional data of said sighting point(s) (UP3–UP5; A–C) within said unstable zone (60; 20) into positional data of said coordinate system of said control point(s).

6. Method according to claim 1, wherein said surveying device(s) (TS8, TS9; ST1–ST3) is/are used without resorting to a physical alignment of its/their main axis with respect to the direction of gravity, said method comprising a step of computing rotational angles of the mechanical axis of said surveying device(s).

7. Method according to claim 1, wherein surveying device (s) (TS8, TS9; ST1–ST3) is/are used in a full three-dimensional reference frame.

8. Method according to claim 1, further comprising a step of associating a GPS (global positioning by satellite) device (22) with at least one sighting point (UP3–UP5; A–C) within said unstable zone (60; 20) to acquire coordinate values thereof, and wherein said GPS coordinate values are exploited in said combining step.

9. Method according to claim 1, wherein:
said control point(s) have at least one known position coordinate ((X1, Y1), (X2, Y2), (X6, Y6), (X7, Y7)) in a first coordinate system (X,Y),
said at least one surveying device (TS8, TS9) is placed at a chosen location in said site to obtain at least one relative coordinate value of at least one said control point relative to the location of said surveying device,
said said at least one surveying device (TS8, TS9) is used at said chosen location to obtain relative coordinate data of said sighting point(s) (UP3–UP5) within said unstable zone relative to the location of said surveying device, and
in said combining step, the position(s), in said first coordinate system (X,Y), of said sighting point(s) located in said unstable zone are determined on the basis of:
said relative coordinate(s) of said sighting point(s) located in said unstable zone relative to said chosen location(s),
said relative coordinate(s) of said control point(s) outside said unstable zone relative to said chosen location(s), and
said position coordinate(s) ((X1,Y1), (X2, Y2), (X6, Y6), (X7, Y7)) of said of said control point(s) outside said unstable zone in said first coordinate system.

10. Method according to claim 1, wherein the number of sighting control point(s) used is established to be equal to, or greater than, the minimum to keep a datum fixed, said minimum being number of points being available for the network of sighting points used in the surveyed site.

11. Method according to claim 1, wherein at least one sighting point (UP3–UP5) within said unstable zone (60) is sighted from more than one chosen location of a said surveying device (TS8, TS9), thereby to acquire a respective relative position value of that sighting point (UP3–UP5) from each said chosen location, and wherein said respective relative position values are used in said combining step.

12. Method according to claim 1, wherein at least one sighting point (UP3–UP5) within said unstable zone (60) is sighted as a common sighting point by a plurality of surveying devices (TS8, TS9) at different locations of said site (2), and wherein position data indicating the position of that common sighting point (UP3–UP5) relative to the position of each said plurality of surveying devices is used in said combining step.

13. Method according to claim 1, wherein said combining step implements a model adjusted by a least squares method.

14. Method according to claim 9, wherein said combining step implements a model adjusted by a least squares method that is used to provide:
   coordinates for a said at least one sighting point (UP3—UP3) located in said unstable zone (60), and
   parameters of said surveying device (TS8, TS9) at said chosen location.

15. Method according to claim 1, wherein said combining step takes as position parameters only the coordinates of said at least one sighting point (UP3–UP5) in a coordinate system of said surveying device (TS8, TS9).

16. Method according to claim 1, wherein more than one surveying device (TS8, TS9) is used on said site (2), whereby a plurality of surveying devices make sightings of a same sighting point (UP3–UP3) and obtain position data of the latter within a common time frame.

17. Method according to claim 1, wherein a total station (TS8, TS9) is used as said surveying device.

18. Method according to claim 1, wherein said combining step is implemented with a coordinate transformation equation establishing a relationship between:
   relative coordinate data of sighted points both within and outside said unstable zone (60), established on a relative coordinate system (x,y) of said at least one surveying device (TS8, TS9), and
   a skew angle (a) between the set of axes of said first coordinate system (X,Y) and said relative coordinate system (x,y).

19. Method according to claim 18, wherein said relationship is established in determinant form.

20. Method according to claim 19, wherein said relationship comprises a first determinant containing relative coordinate data of at least one sighting point (UP3–UP5) located in said unstable zone (60), determined from two or more surveying positions, operating as a multiplier on a column vector of numerical parameters of said surveying device(s) (TS8, TS9).

21. Application of the method according to claim 1 for establishing the position of at least one sighting point (UP3–UP5) located in an unstable zone (60) in terms of a position on a coordinate grid system which also maps fixed control points (CP), whereby said at least one sighting point (UP3–UP5) located in an unstable zone (60) becomes exploitable as a sighting control point.

22. Application of the method according to claim 1 for establishing the position of at least one sighting point (UP3–UP5) located in the unstable zone (60) in terms of a position on a coordinate grid system to monitor evolutions in position of said at least one sighting point.

23. System for ground-based surveying on a site (2) which comprises an unstable zone (60; 20) and at least one control point (FCP1, FCP2, FCP6, FCP7; CP1–CP3) placed outside said unstable zone, comprising at least one surveying device (TS8, TS9; ST1–ST3) arranged to acquire positional data by sighting least one control point (FCP1, FCP2, FCP6, FCP7; CP1–CP3), characterised in that it further comprises:
   at least one sighting point (UP3–UP5; A–C) within said unstable zone (60; 20), at least one said surveying device (TS8, TS9; ST1–ST3) being arranged to acquire positional data by sighting at least said sighting point within said unstable zone, and
   means for combining the positional data acquired from: i) said at least one control point (FCP1, FCP2, FCP6, FCP7; CP1–CP3) placed outside said unstable zone and ii) at least one sighting point (UP3–UP5; A–C) within said unstable zone (60; 20), to produce a positional reference for said surveying device(s).

24. System according to claim 23, further configured to execute a method of ground-based surveying on a site (2) which comprises an unstable zone (60; 20) and at least one control point (FCP1, FCP2, FCP6, FCP7; CP1–CP3) placed outside said unstable zone, in which method at least one surveying device (TS8, TS9; ST1–ST3) is used to acquire positional data by sighting least one control point (FCP1, FCP2, FCP6, FCP7; CP1–CP3), characterised in that it further comprises the steps of:
   providing at least one sighting point (UP3–UP5; A–C) within said unstable zone (60; 20),
   using said surveying device(s) (TS8, TS9; ST1–ST3) to acquire positional data by sighting said at least one sighting point (UP3–UP5; A–C) that is located within said unstable zone (60; 20), and
   combining the positional data acquired from: i) said at least one control point (FCP1, FCP2, FCP6, FCP7; CP1–CP3) placed outside said unstable zone and ii) at least one sighting point (UP3–UP5; A–C) within said unstable zone (60; 20), to produce a positional reference for said surveying device(s), wherein more than one surveying device (TS8, TS9; ST1–ST3) is used, and wherein a plurality of surveying devices sight in common at least one common sighting point (UP3–UP5; A–C) that is located in said unstable zone (60; 20), and wherein said positional data from the common sighting point(s) acquired by said surveying devices are used as positional data in said combining step.

25. Executable code which, when run on a data processor, executes at least the combining step of claim 1.

26. Executable code according to claim 25, which, when run on a data processor, executes calculations in respect of a method of ground-based surveying on a site (2) which comprises an unstable zone (60; 20) and at least one control point (FCP1, FCP2, FCP6, FCP7; CP1–CP3) placed outside said unstable zone, in which method at least one surveying device (TS8, TS9; ST1–ST3) is used to acquire positional data by sighting least one control point (FCP1, FCP2, FCP6, FCP7; CP1–CP3), characterised in that it further comprises the steps of:
   providing at least one sighting point (UP3–UP5; A–C) within said unstable zone (60; 20), using said surveying device(s) (TS8, TS9; ST1–ST3) to acquire positional data by sighting said at least one sighting point (UP3–UP5; A–C) that is located within said unstable zone (60; 20), and combining the positional data acquired from: i) said at least one control point (FCP1, FCP2, FCP6, FCP7; CP1–CP3) placed outside said unstable zone and ii) at least one sighting point (UP3–UP5; A–C) within said unstable zone (60; 20), to produce a positional reference for said surveying device(s).

27. A data carrier storing the executable code of claim 25.

28. A processing apparatus loaded with the executable code of claim 25.

* * * * *